US006514914B1

(12) United States Patent
Paliyath et al.

(10) Patent No.: US 6,514,914 B1
(45) Date of Patent: Feb. 4, 2003

(54) INHIBITION OF PHOSPHOLIPASE D

(75) Inventors: Gopinadhan Paliyath, Waterloo (CA); Rickey Yada, Guelph (CA); Dennis P. Muir, Guelph (CA); Reena G. Pinhero, Guelph (CA)

(73) Assignee: University of Guelph, Guelph (CA)

( * ) Notice: Subject to any disclaimer, the term of this patent is extended or adjusted under 35 U.S.C. 154(b) by 0 days.

(21) Appl. No.: 09/498,623

(22) Filed: Feb. 7, 2000

Related U.S. Application Data
(60) Provisional application No. 60/119,023, filed on Feb. 8, 1999.

(51) Int. Cl.[7] ............... A01N 31/02; A01N 35/02
(52) U.S. Cl. ............... 504/348; 504/353; 514/693; 514/703; 514/724; 514/739
(58) Field of Search ............... 504/348, 353; 514/693, 703, 724, 739

(56) References Cited

U.S. PATENT DOCUMENTS

| | | | | |
|---|---|---|---|---|
| 3,630,717 A | * | 12/1971 | Miller | 71/122 |
| 4,336,273 A | * | 6/1982 | Lee | 426/321 |
| 4,368,207 A | * | 1/1983 | Lover et al. | 424/343 |
| 5,670,366 A | | 9/1997 | Wang | 435/252.33 |
| 5,747,327 A | | 5/1998 | Ueki et al. | 435/252.3 |
| 5,776,919 A | * | 7/1998 | Sukigara et al. | 514/161 |
| 6,045,844 A | * | 4/2000 | Song et al. | 426/312 |
| 6,051,612 A | * | 4/2000 | Borden et al. | 514/693 |
| 6,074,634 A | * | 6/2000 | Lopez, Jr. et al. | 424/84 |

OTHER PUBLICATIONS

Allgyer, T. T.; Wells, M. A. *Biochem.* 1979, 18, 5348–5353.
Bradford, M. M. *Anal. Biochem.* 1976, 72, 248–254.
Brauer, D.; Nungesser, E.; Maxwell, R. J.; Schubert, C.; Tu, S. I. *Plant Physiol.* 1990, 92, 672–678.
Cockfort, S. *Prog. Lipid Res.* 1997, 35, 345–370.
Deng, W. et al. *J. Agric. Food Chem.*, 1993, 41:506–510.
Dyer, J. H.; Ryu, S. B.; Wang, X. *Plant Physiol.* 1994, 105, 715–724.
Dyer, J. H.; Zheng, S.; Wang, X. *Biochim. Biophys Res. Comm.* 1996, 221, 31–36.
Exton, J. H. Phospholipase D. *Physiol Rev.* 1997, 77, 303–320.
Edwards, G. E.; Gardestrom, P. *Methods Enzymol.* 1987, 148, 421–433.
Fan, L. et al. *The Plant Cell*, 1997, 9:2183–2196.
Galliard, T. In *The Biochemistry of Plants, A comprehensive Treatise*; Stumpf, P.K., Conn, E. E. Eds.; Academic Press: New York, 1980, vol. 4, 85–116.
Harris, W. E.; Knutson, C. M.; Stahl, W. L. *Plant Physiol. Biochem.* 1995, 33, 389–398.
Heller, M.; Mozes, N.; Pero(Abramovitz), I.; Maes, E. *Biochem. Biophys. Acta.*1974, 369 397–410.
Herman, E. M.; Chrispeels, M. J. *Plant Physiol.* 1980, 66, 1001–1007.
Imamura, S.; Horiuti, Y. *J. Biochem.* 1979, 85, 79–95.
Kates, M. *Can. J. Biochem. Physiol.* 1955, 33, 575–589.
McCormac, D. J.; Todd, J. F.; Paliyath, G.; Thompson, J. E. *Plant Physiol Biochem.* 1993, 31, 1–8.
Merillon, J. M.; Filali, M.; Duperon, P.; Montagu, M.; Chenieux, J. C.; Rideau, M. *Plant Physiol. Biochem.* 1995, 33, 443–451.
Muroi, H., et al., *J. Agric. Food Chem.* 1993, 41:1106–1109.
Natarajan, V.; Scriber, W. M.; Taher, M. M. *Free Radicals Biol. Med.* 1993, 15, 365–375.
Paliyath, G; Thompson, J. E. *Plant Physiol.* 1987, 83, 63–68.
Paliyath, G.; Droillard, M. J. *Plant Physiol. Biochem.* 1992, 30, 789–812.
Pinhero, R. G.; Paliyath, G.; Yada, R. Y.; Murr, D. P. *Plant Physiol. Biochem.* 1998, 36, 213–224.
Quarles, R. H.; Dawson, R. M. C. *Biochem. J.* 1969, 112, 787–794.
Ryu, S. B.; Wang, X. *Plant Physiol.* 1995, 108, 713–719.
Ryu, S.B.; Zheng, L.; Wang, X. *J. Amer. Oil Chemists. Soc.* 1995, 73,1171–1176.
Ryu, S.B.; Wang, X. *Biochim. Biophys. Acta*, 1996, 1303, 243–250.
Ryu, S. B.; Karlson, B. H.; Ozgen, M.; Palta, J. P. *Proc. Natl. acad. Sci. USA.*, 1997, 94,12717–12721.
Song, J. et al. *HortScience*, 1996, 31(4):590, abstract #146.
Todd, J. F; Paliyath, G.; Thompson, J. E. *Plant Physiol. Biochem.*, 1992, 30, 517–522.
Ueki, J.; Morioka, S.; Komari, T.; Kumashiro, T. *Plant Cell Physiol.*, 1995, 36, 903–914.
Vaughn, S.F. et al. *J. Chem. Ecol.* 1993, 19(10):2337–2345.
Voisine, R.; Vezina, L–P.; Willemot, C. *Plant Physiol* .1993, 102, 213–218.
Wang, X.; Dyer, J. H.; Zheng, L. *Arch Biocehm Biophys.* 1993, 306, 486–494.
Wang, X. *Trends in Plant Science*, 1997, 2:261–266.
Witt, W.; Yelenosky, G.; Mayer, R. T. *Archiv. Biochem. Biophy.* 1987, 259, 164–170.
Xu, L.; Paulsen, A. Q.; Ryu, S. B.; Wang, X. *Plant Physiol.*1996, 111, 101–107.
Yoshida, S. *Plant Physiol.* 1979, 64, 241–246.

\* cited by examiner

*Primary Examiner*—S. Mark Clardy
(74) *Attorney, Agent, or Firm*—Quarles & Brady LLP

(57) ABSTRACT

A method for inhibiting phospholipase D-mediated degradation of membrane phospholipids comprising administering to the membrane an effective amount of a phospholipase D inhibitor selected from the group of phospholipase D inhibitors consisting of $C_6$ aldehydes, $C_6$ alcohols, monoterpene aldehydes and monoterpene alcohols. The phospholipid D inhibitors can be administered to plants, fruits or vegetables to inhibit maturation or ripening.

45 Claims, 22 Drawing Sheets

INHIBITION OF PHOSPHOLIPASE D

This application claims the benefit of Provisional Application No. 60/119,023, filed Feb. 8, 1999.

FIELD OF THE INVENTION

This invention is directed to a method of inhibiting Phospholipase D. It is further directed to the use of Phospholipase D inhibitors to inhibit Phospholipase D-mediated degradation of membrane phospholipids in plants and produce.

BACKGROUND OF THE INVENTION

The maturation and ripening of several perishable plant produce is associated with the catabolic breakdown of cellular structures such as membrane and cell wall which is a normal process in the development of ideal organoleptic quality. Untimely destruction of the cellular integrity of produce as occurs during processing (cutting, wounding, blending, maceration etc.) or storage (injury due to chilling) can lead to accelerated destruction of cellular structures sometimes resulting in the loss of quality of the product.

Phospholipase D (PLD) is a ubiquitous, key enzyme that catalyzes the hydrolysis of membrane phospholipids such as phosphatidylcholine, phosphatidylethanolamine, phosphatidylinositol, phosphatidylglycerol, etc . . . to yield phosphatidic acid and the respective headgroup (Kates, 1955; Galliard, 1980; Exton, 1997). In vitro, PLD also catalyzes the exchange of phospholipid headgroups with primary alcohols such as methanol and ethanol, leading to the formation of phosphatidylalcohols. This reaction is termed transphosphatidylation (Galliard, 1980; Cockcroft, 1997). PLD is wide-spread in a variety of plant species (Quarls and Dawson, 1969; Galliard, 1980). Soluble and membrane-associated PLD have been reported in various plant species (Yoshida, 1979; Galliard, 1980; Xu et al., 1996). Various physiological processes such as germination (Wang et al., 1993), growth of seedlings (Herman and Chrispeels, 1980), stress-induced changes and senescence (Yoshida, 1979; Paliyath and Droillard, 1992) have been suggested to be regulated by PLD. A high activity of PLD has been found in storage tissues, especially in seeds (Heller et al., 1974). Activation of PLD is elicited by a variety of agonists in different cell types leading to the tandem generation of messengers, namely phosphatidic acid and diacylglycerol, that affect many significant. cellular processes (Paliyath and Droillard, 1992; Exton, 1997).

Previous studies have shown that exposure of black locust bark tissues to frost as well as wounding (Yoshida, 1979) and chilling of maize seedlings (Pinhero et al., 1998) resulted in an increase in PLD activity causing massive lipid degradation and membrane deterioration. It has also been reported that PLD is responsible for the hydrolysis of spherosome membrane phospholipids which causes triacylglycerol leakage from spherosomes with subsequent degradation (Takano et al., 1989). Increased association of PLD with microsomal membranes has been proposed to promote PLD-mediated degradation of membrane lipids during γ-irradiation and senescence (Voisine et al., 1993; Ryu and Wang, 1995). During fruit ripening, decreased fluidity of microsomal membrane has been reported to activate PLD and increase membrane catabolism (McCormac et al., 1993). Under such conditions PLD activity proceeds in an autocatalytic fashion leading to the total destruction of structural and functional organization of the membrane and abolition of membrane compartmentation (Paliyath and Droillard, 1992).

Preservation of membrane compartmentation is a must for maintaining th e quality of unprocessed perishable plant produce such as corn kernels, leafy vegetables, flowers (cauliflower, broccoli) and fruit. Many of these commodities are used for fresh consumption as well as processing, such as canning, making of soups, jams, sauces, and blending for juice-making. During processing, various produce are subjected to chilling, freezing, heating, mixing with salts, preservatives, solvents etc. which destroy the cellular compartmentation. Excessive catabolic break down can lead to loss of processed food quality such as that observed in the mushiness and off flavour of some processed products. PLD activity appears to be regulated by a number of factors including temperature. To inhibit PLD activity processing corn is harvested in bulk and stored at low temperature. Chilling of corn should be rapid to quickly bypass the temperature regime between 15° C. and 5° C. where the activity of PLD is much higher. However, at lower temperatures, there is also differential stimulation of other enzymes involved in membrane lipid degradation. For instance, phosphatidate phosphatase and lipolytic acyl hydrolase activities are considerably lower at 4° C. than PLD activity in tomato microsomal membranes (Todd et al. 1992 ). If this were to occur in vivo, there would be abundant accumulation of phosphatidic acid in the membrane at low chilling temperatures that would lead to break down in cellular compartmentation. This would decrease the quality of the produce. Consequently, a product and method for preventing membrane breakdown is required.

SUMMARY OF THE INVENTION

The present invention provides a method of inhibiting phospholipase D mediated degradation of membrane phospholipids by administering to the membrane an effective amount of a phospholipase D inhibitor to inhibit degradation. In one embodiment the phospholipase D inhibitor is administered to tissue comprising the membrane. In a preferred embodiment of the invention, the phospholipase D inhibitor is selected from the group consisting of $C_6$ aldehydes, $C_6$ alcohols, and monoterpene aldehydes and alcohols. Examples of suitable monoterpene alcohols and aldehydes include: geraniol, citronellol, nerol, and their corresponding aldehydes. More preferably, the phospholipase D inhibitor is hexanal, hexanol, hexenal or hexenol. Most: preferably the phospholipase D inhibitor is hexanal or hexanol.

Preferably, the membrane is a membrane of a plant, fruit or vegetable and the phospholipase D inhibitor is administered to the plant, fruit or vegetable. In a preferred embodiment the membrane is that of sweet corn (*Zea mays*). In another embodiment the membrane is that of tomato fruit.

In another aspect of the invention, there is provided a method of inhibiting maturation or ripening of a plant, fruit or vegetable, comprising administering to the plant, fruit or vegetable an effective amount of a phospholipase D inhibitor. Preferably, the inhibitor is selected from the group consisting of $C_6$ aldehydes, $C_6$ alcohols, and monoterpene aldehydes and alcohols. Examples of suitable monoterpene alcohols and aldehydes include geraniol, citronellol, nerol, and their corresponding aldehydes. More preferably the phospholipase D inhibitor is hexanal, hexanol, hexenal or hexenol. Most preferably the phospholipase D inhibitor is hexanal or hexanol.

In another embodiment of the invention, there is provided a use of an effective amount of a phospholipase D inhibitor for inhibiting phospholipase D-mediated degradation of membrane phospholipids. Preferably, the inhibitor is selected from the group consisting of $C_6$ aldehydes and $C_6$ alcohols and monoterpene aldehydes and alcohols. Examples of suitable monoterpene alcohols and aldehydes include geraniol, citronellol, nerol, and their corresponding aldehydes. More preferably the phospholipase D inhibitor is hexanal, hexanol, hexenal or hexenol. Most preferably the phospholipase D inhibitor is hexanal or hexanol.

In one embodiment, the invention is directed to a plant, fruit, or vegetable that has been treated with a phospholipase D inhibitor, preferably, in an amount effective to inhibit maturation or ripening of the plant, fruit or vegetable. The phospholipase D inhibitor is preferably selected from the group consisting of $C_6$ aldehydes and $C_6$ alcohols and monoterpene aldehydes and alcohols. Examples of suitable monoterpene alcohols and aldehydes include geraniol, citronellol, nerol, and their corresponding aldehydes. More preferably the phospholipase D inhibitor is hexanal, hexanol, hexenal or hexenol. Most preferably the phospholipase D inhibitor is hexanal or hexanol.

The term "effective amount" as used herein would be understood by a person skilled in the art when reading the present description to mean an amount which is sufficient to produce the specified desired result, whether it be inhibition of Phospholipase D activity, inhibition of membrane phospholipid degradation, or the inhibition of maturation or ripening of a plant, fruit or vegetable. Preferably the phospholipase inhibitor is applied at a concentration of 0.01–01 μl/ml if it is to be left on the membrane. In another preferred embodiment the inhibitor is applied at a concentration of 1–10 μl/ml, potentially as a sprayed 1× pulse, and subsequently washed off after treatment.

The term "tissue" as used herein means a mass of similar cells and their intercellular substance, working together to perform a particular function.

In an embodiment the inhibitor is administered to the membrane or tissue comprising the membrane in a non-toxic amount. That is an amount which in the end product is not-toxic or not harmful to the end user of the product.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will now be described in relation to the drawings in which.

DETAILED DESCRIPTION OF THE INVENTION

Figure 1:
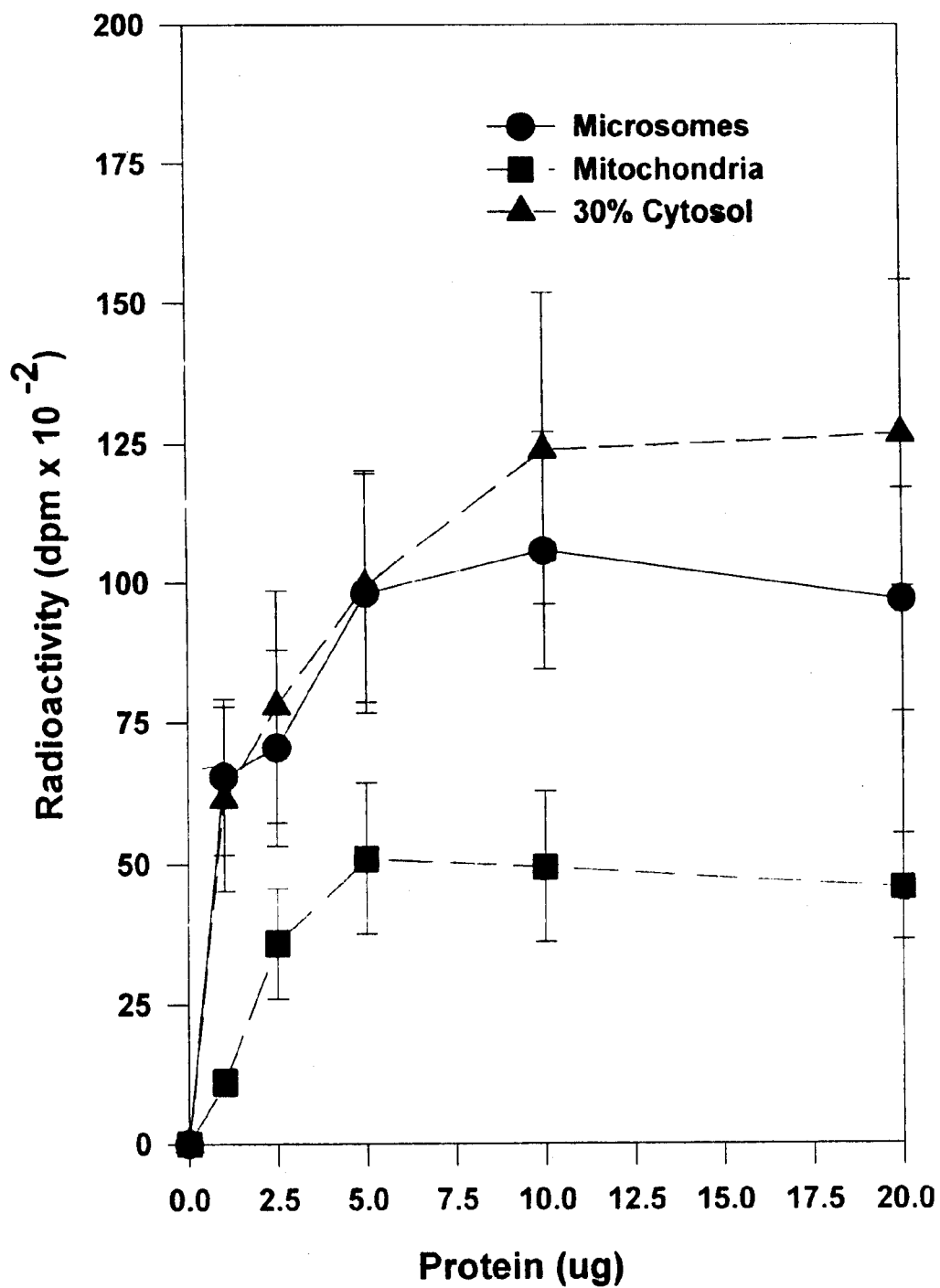
FIG. 1 illustrates the effect of protein on the activity of phospholipase D in sweet corn kernel.

As noted above, the present invention provides a method for reducing PLD mediated degradation of membranes containing phospholipids comprising exposing or treating the membrane or tissue comprising the membrane with an effective amount of a PLD inhibitor.

PLD activity is central to the maintenance of membrane properties and function because of its involvement in both membrane biogenesis and deterioration. Its activity is regulated by several environmental factors such as heating, chilling, and freezing; hormones such as auxins, ethylene, cytokinins; ions such as $Ca^{2+}$, $Mg^{2+}$ and $H^+$; membrane rigidifying agents such as polyamines; and solvents such as ethanol (Paliyath and Droillard, 1992; Merillon et al., 1995).

Inhibition of PLD by acetaldehyde could serve as a check for inhibiting membrane lipid degradation under stressful conditions, where anaerobic pathways could be activated (e.g. chilling). Similarly, hexanal and hexanol are byproducts of lipoxygenase and associated enzyme activities in plant systems, that are part of the autocatalytic membrane deteriorative pathways (Paliyath and Droillard, 1992). Thus, inhibition of PLD by hexanal and hexanol could serve as a check point for arresting membrane lipid degradation. These components are also part of the natural flavor ingredients and could be of potential use in preventing excessive membrane lipid degradation during storage or under processing conditions. Accordingly, there is provided a method of reducing degradation of membranes by contacting or administering to the membrane or tissue comprising the membrane an effective amount of a PLD inhibitor, preferably selected from the group consisting of $C_6$ aldehydes, $C_6$ alcohols, and monoterpene aldehydes and alcohols. Examples of suitable monoterpene alcohols and aldehydes include geraniol, citronellol, nerol, and their corresponding aldehydes. Preferably the phospholipase D inhibitor is hexanal, hexanol, hexenal or hexenol. More preferably the phospholipase D inhibitor is hexanal or hexanol. Most preferably hexanal is used.

Methods of Administration

The compounds of the present invention can be administered to membranes in a variety of ways including, without limiting the generality of the concept of "administration", by injecting fruit or vegetables, spraying, brushing, 1× spray pulse and subsequent washing, wiping or immersing the particular fruit or vegetable in a bath of a solution containing the PLD inhibitor. The inhibitors may also be in solution and vaporized into a chamber in which the larger membrane is contained. In a preferred embodiment the fruits and vegetables are sprayed prior to harvest.

Formulations of Inhibitor

The present invention may be administered in a per se solution containing PLD inhibitor, water and/or a mild buffer. Examples of buffer which may be used are phosphate or 0.1 M KCI. Preferably the pH of the solution is between 5–6. Alternatively, PLD inhibitor may be formulated in a powered formulation and reconstituted for administration.

Pretreatment of Target Membranes

While PLD inhibitor can be administered to freshly picked fruit or vegetables, it can also be administered to fruit which has been dried, sliced, or even blended, or pureed. It is also possible to administer inhibitor prior to harvesting of target fruit or vegetables, preferably by spraying the target fruit or vegetable about 1 to 2 weeks prior to harvest. In another embodiment the inhibitor can be administered up to the day prior to harvesting.

Conditions for Administration

According to a preferred embodiment, the inhibitor is contained in a solution of water or monovalent salts, for example KCI, preferably at a pH of 5–6. For partially processed fruits or vegetables, the inhibitor is preferably administered for 2.5–5 minutes at a concentration of preferably 1–10 $\mu$l/ml potentially as a spray 1× pulse or by immersion. At this concentration the produce is preferably washed after treatment. If the inhibitor is to be left on without subsequent washing, it is preferable to administer the inhibitor at a preferred concentration of 0.01–0.1 $\mu$l/ml.

The following non-limiting examples are illustrative of the present invention:

EXAMPLES

Materials and Materials and Methods Used in the Examples

General

Protein Extraction. Sweet corn (*Zea mays* L. cv Peaches and Cream) was used for this study. The kernels were obtained locally from a grocery store and stored frozen at −20° C. until it was used for protein extraction. Frozen kernels were homogenized in 0.1 m Tris-HCl buffer at pH 7.5 essentially as described by Pinhero et al. (1998), except that sucrose was not included in the homogenizing buffer. The mitochondrial, microsomal and the cytosolic fractions were collected by differential centrifugation (Pinhero et al., 1998). The fraction comprising the starch granules was removed by centrifuging the samples at 2500×g for 10 minutes. The resulting supernatant was subjected to centrifugation at 15,000×g to pellet the mitochondrial membrane fraction (Edwards and Gardestrom, 1987). The supernatant from this step was centrifuged at 105,000×g to pellet the microsomal membranes. The supernatant comprising the cytosol was subjected to ammonium sulphate fractionation at 30 and 60% saturation. The precipitated protein was collected by centrifugation at 15000×g and redissolved in 10 mM Tris-HCl pH 7.0 and dialyzed overnight with the same buffer, also containing 0.1 mM DTT, with two changes of 2 L each. Protein concentration was determined by the method of Bradford (1976) using bovine serum albumin as a standard. All steps of protein extraction procedure were carried out at 4° C.

Chemicals. Phosphatidylcholine [$L_3$-phosphatidyl(N-methyl-$^3$H)choline,1,2-dipalmitoyl], (3.00 TBq mmol$^{-1}$) was purchased from Amersham Life Sciences. DEAE-Sephacel, Sephacryl S-300 and other chemicals were purchased from Sigma Chemical Co.

Enzyme Assay. PLC activity was determined as described by Pinhero et al. (1998) by measuring the release of radio-labelled choline from $L_3$-phosphatidyl(N-methyl-$^3$H) choline,1,2-dipalmitoyl at 23° C. The basic assay mixture contained 0.1 M Tris-HCl (pH 7.5), 0.2 mM EGTA, membrane or cytosol protein (2.5 $\mu$g), and approximately 100,000 dpm of choline-labelled phosphatidylcholine in 0.1% (v/v) Triton-X 100 (0.01% final), to make a total volume of 1 ml. To study the regulation of PLD by alcohols, aldehydes and metal ions, the appropriate amounts of the reagent solutions were added to the basic reaction mixture. Similarly, citrate and Tris-HCl buffers were used to study the effect of pH on PLD activity. The reaction was terminated after 10 minutes by adding 100 $\mu$L of 4 N HCl followed by 1 mL of chloroform/methanol (2:1, v/v) and left overnight. The amount of [$^3$H]choline released during the reaction was determined by mixing a 0.5 ml aliquot of the aqueous phase directly into 5 ml of scintillation fluid (Ecolume, ICN) and determining the amount of radiolabel using a Beckman LS 6800 Scintillation counter (Beckman Instruments Inc.).

Purification of Phospholipase D. Mitochondrial, microsomal and cytosolic fractions from several extractions were pooled and stored frozen at −80° C. The cytosolic fraction was clarified by filtration through Whatman 935 AH glass fibre filters and subjected to ammonium sulphate fractionation at 30% saturation. The pellet obtained from the centrifugation of the precipitated protein was dissolved and dialyzed against 10 mM Tris-HCl, 0.1 mM DTT and 0.1 mM EDTA for 20 h, with 3 changes of the buffers (2 L each). The protein solution was clarified by centrifugation (15,000×g) and loaded on a DEAE-Sephacel column (50 cm×2.5 cm) equilibrated with 0.1 M Tris-HCl, pH 7.5, 1 mM EDTA and 1 mM DTT, at the rate of 0.3 ml/min. The column was washed at 30 ml/h with the same wash buffer until no UV-absorbing material was detectable in the effluent. Bound protein was eluted by a NaCl gradient of 0 to 1 M NaCl in the wash buffer. Fractions of 7 ml were collected at a flow rate of 1 ml/min and assayed for protein concentration, PLC activity and absorbance at 280 nm. Fractions containing peak levels of enzyme activity were pooled separately into two major fractions and precipitated with the addition of ammonium sulphate at 90% saturation. The pellet was collected after centrifugation at 15,000×g for 15 min and dissolved in 10 mM Tris-HCl containing 0.1 mM DTT. The protein was dialyzed against 2 L of 10 mM Tris-HCL, pH 7.0 containing 0.1 mM EDTA and 0.1 mM EGTA and concentrated by lyophilization. The dry powder was stored frozen at −80° C.

For purification of mitochondrial and microsomal phospholipase D, the membrane protein was solubilized by the addition of 0.5% (v/v) Triton X-100. Unsolubilized materials were separated by centrifugation at 105,000×g for 1 h. The clear supernatant was subjected to ion exchange chromatography on DEAE Sephacel as described earlier. Fractions containing peak levels of PLD activity were pooled and concentrated by lyophilization. The dry powder was stored frozen at −80° C. Further purification was achieved by gel filtration on a Sephacryl S-300 HR column (50 cm×1 cm) using a Waters 616/626 FPLC system (Waters Canada). The column was equilibrated with 10 mM Tris-HCl, pH 7.0. The protein samples equivalent to 100 µg protein was fractionated on the column at a flow rate of 0.5 ml/min using 10 mM Tris-HCl, pH 7.5 containing 0.02 mM EDTA and 0.02 mM DTT. Fractions of 0.5 ml were collected and assayed for phospholipase D activity. The relative molecular masses of the major peaks eluted, were calculated using a standard calibration curve prepared with gel filtration molecular mass markers (MW-GF-200 Kit, Gel filtration molecular markers, cytochrome C-12.4 kD, carbonic anhydrase-29 kD, bovine serum albumin-66 kD, alcohol dehydrogenase-150 kD, and β-amylase-200 kD) obtained from Sigma Chemical Co., USA.

The existence of several isoforms of PLD has recently been confirmed in several dicot plants such as soybean and castor bean whose synthesis is temporarily regulated during development (Dyer, 1996; Ryu et al., 1996). PLD exists in membranous and cytosolic forms. In previous studies PLD had been isolated from total tissue homogenate and potential differences in biochemical properties of cytosolic and membranous forms had not been given due consideration. Moreover, the properties of PLD in chloroplast, mitochondria, endoplasmic reticulum, plasma membrane and the vacuole have not been heretofore studied.

In a food system such as corn kernels, the properties of these compartmentalized PLD could be modulated differently under processing conditions. Therefore, properties of PLD were studied in the mitochondrial and plastic fractions (15,000×g pellet), the microsomal fraction that comprise endoplasmic reticulum, plasma membrane and vacuolar membranes and the cytosolic fraction separately.

Estimation of PLD activity by monitoring the liberation of choline is a convenient and rapid method, and is comparable to other methods of estimating PLD activity such as with the use of fluorescent substrates or the estimation of phosphatidylethanol formed (Harris et al., 1995; Pinhero et al., 1998). This method has been consistently used in our laboratory for several studies (Paliyath and Thompson, 1987; Todd et al., 1992; Pinhero et al. 1998).

Example 1

Phospholipase D Activity in Various Protein Fractions from Sweet Corn Kernels

PLD activity showed a linear increase in activity with increasing protein levels in the assay mixture and attained a plateau after 10 µg protein level in the cytosolic, microsomal and mitochondrial fractions (see FIG. 1). Ammonium sulfate fractionation of the cytosolic fraction at 30% and 60% saturation showed the presence of PLD activity in both, albeit at different specific activities (data not shown). The protein pellet that resulted after 30% saturation appeared to possess higher specific and total activities and was used in all further experiments. However, cytosolic PLD activity varied considerably, and in some preparations showed lower specific activity than the microsomes. The specific activity of PLD in the mitochondrial fraction was the lowest and appeared to be nearly half of the specific activity of microsomal PLD. On a specific activity basis, cytosol showed $3 \times 10^6$ dpm/mg/min in the 30% cytosol and microcosomal fractions. The specific activity of the mitochondrial fraction was nearly half of that in cytosol and microsomal fractions and reached $1.45 \times 10^6$ dpm/mg/min. The total activity of PLD was highest in cytosol followed by mitochondria and microsomes, the activities being 179, 81.7 and $38.5 \times 10^4$ dpm/g fresh weight. PLD activity was rapid and the formation of choline reached a plateau within 2.5 min of initiating the reaction in all the protein fractions (data not shown).

Example 2

Effect of Temperature on Phospholipase D Activity

Figure 2:
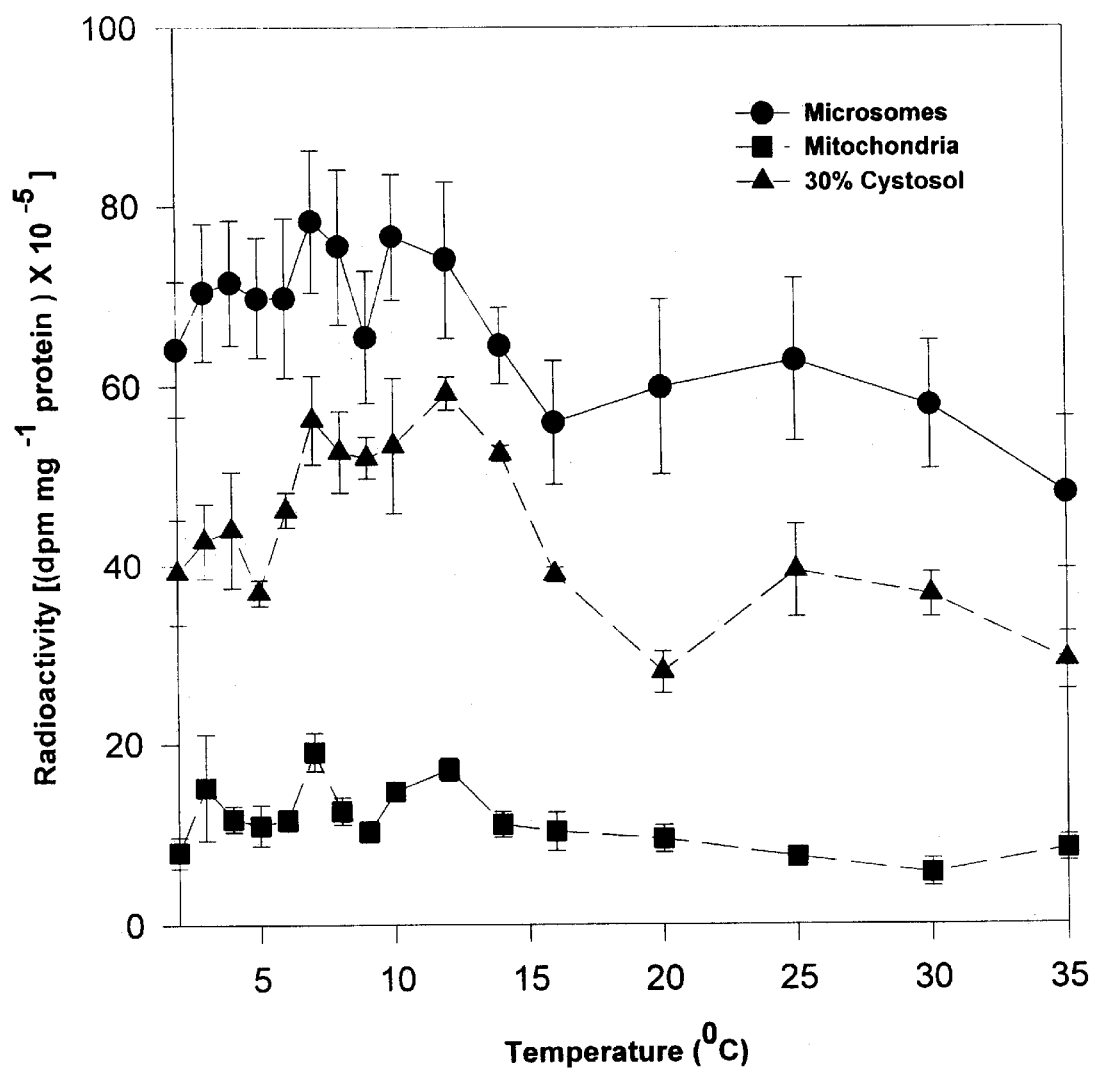
FIG. 2 illustrates the effect of temperature on phospholipase D activity of sweet corn kernel.

Temperature is an important variable that affects the quality of various perishable produce during postharvest storage or during processing. The effect of varying temperature on PLD activity in the microsomal, mitochondrial and cytosolic fractions was studied to understand the differential effects of temperature on these enzyme preparations. Since the activity of membranous PLD is affected by its membrane environment, the changes in physicochemical properties of the membrane such as phase transitions, changes in gel to liquid crystalline state, ionic state of the head groups etc. can affect its activity (Paliyath and Droillard, 1992). In contract, cytosolic PLD is not normally subjected to such conditions unless it becomes membrane-bound. The temperature was varied from 2.5° C. to 35° C., and PLD activity was estimated at varying intervals. Mitochondrial PLD did not show significant variations with changing temperature between 15° and 35° C. (see FIG. 2). However, between 6° C. and 15° there was a near doubling in the activity, notably at 7.5° and 12.5° C. Microsomal PLD increased with decreasing temperature especially between 15° C. and 5° C. Cytosolic PLD activity followed a similar profile, showing nearly 50% enhancement of its activity at 30° C. Thus, cytosolic PLD showed the highest degree of promotion in activity between 5° and 15° C. (FIG. 2).

Example 3

Effect of varying pH on phospholipase D

Figure 3:
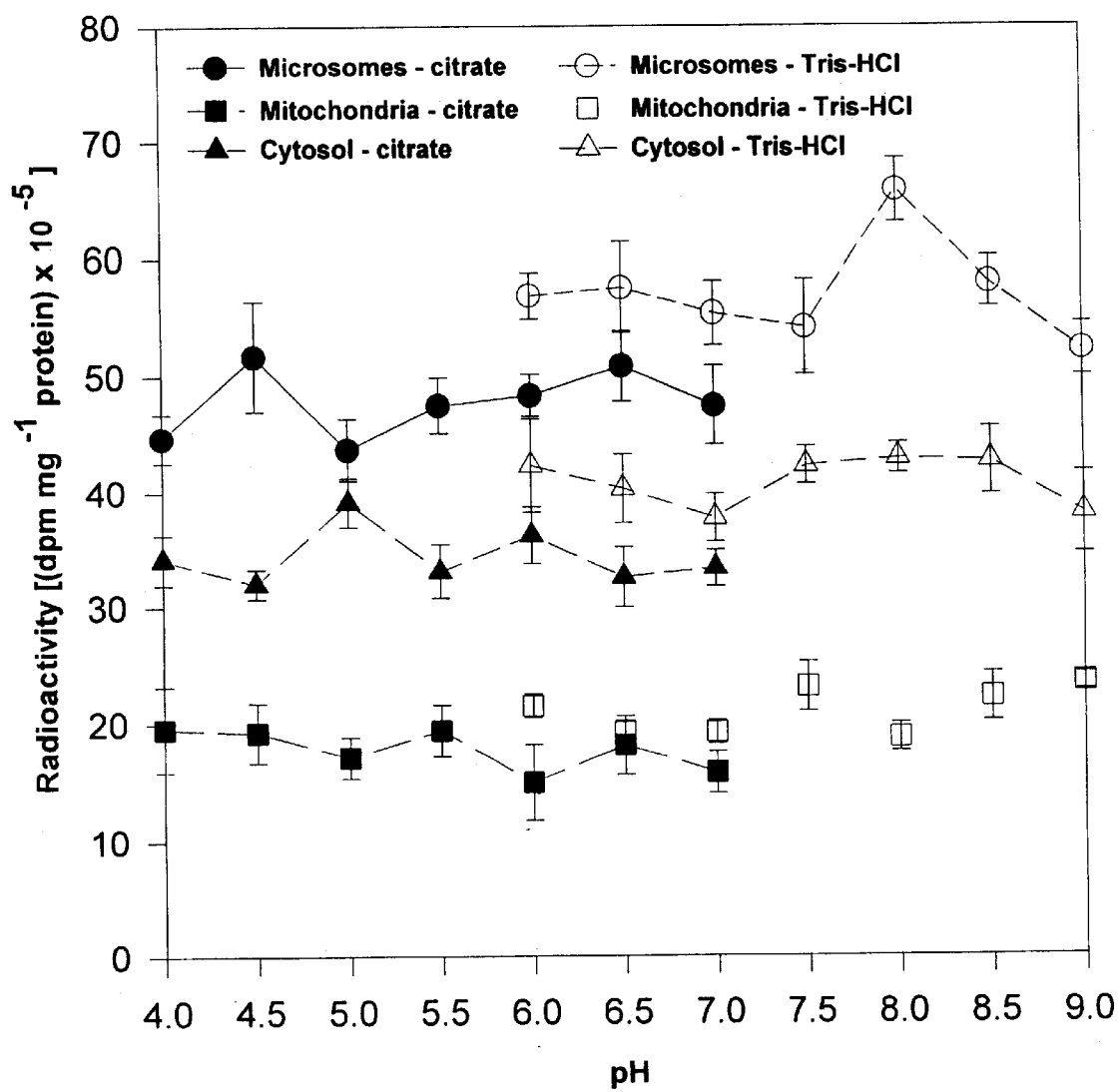
FIG. 3 illustrates the effect of pH on phospholipase D activity of sweet corn kernel.

It has been reported that this PLD activity is promoted at an acidic pH (Galliard, 1980). Under processing conditions, wounding or blending of tissue likely results in mixing of intracellular contents resulting in changes in pH. Therefore, the potential effects of changing pH on the activities of microsomal, mitochondrial and cytosolic PLD was investigated. Citrate buffer in the range of pH 4 to 7 and Tris-HCl in the pH range of 6 to 9 were used for these estimations. As can be seen in FIG. 3, there does not appear to be dramatic effect of changing pH on PLD activity in corn. Mitochondrial PLD retained similar activity throughout the pH ranges tested. Cytosolic and microsomal preparations showed a slight enhancement in activity (10%) in the pH range of 7.5 to 8.5. Corn kernel PLD does not appear to be affected significantly by changing pH.

Example 4

Modulation of Phospholipase D by Aldehydes and Alcohols

When chilling-sensitive produce are cooled for storage, especially under low oxygen atmosphere, the storage conditions induce the anaerobic respiratory pathway leading to the formation of ethanol and acetaldehyde. PLD has a special characteristic termed transphosphatidylation in which, the enzyme, in the presence of alcohols, exchanges the phospholipid head group for the alcoholic moiety leading to the production of phosphatidylalcohols (e.g. phosphatidylethanol, phosphatidylmethanols etc.). There is a promotion of PLD activity in the presence of alcoholic solvents especially at elevated temperature. It is likely that harvested corn stored under cold, low oxygen conditions before processing, respires anaerobically causing the formation of ethanol and acetaldehyde, both of which are off-flavors for processed products of corn. As well, these compounds could also affect PLD during processing. Therefore, the effects of ethanol and acetaldehyde on PLD activity was investigated.

Figure 4:
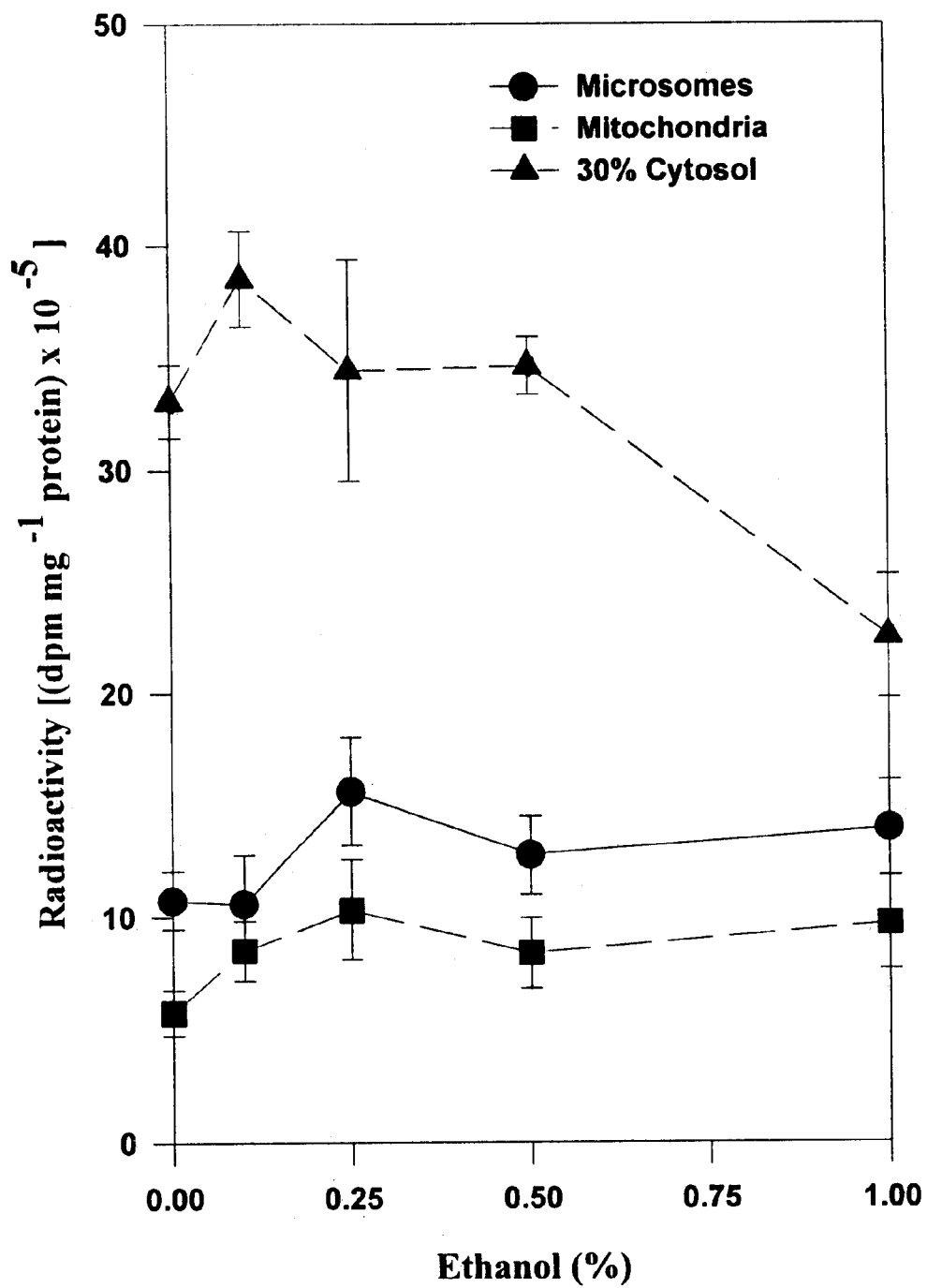
FIG. 4 illustrates the effect of ethanol on phospholipase D activity of sweet corn kernel.

Both mitochondrial and microsomal PLD activities were stimulated maximally at 0.25% ethanol (v/v) (see FIG. 4). The magnitude of stimulation ranged from 100% in the case of mitochondrial fraction to 50% in the case of microsomal fraction. Cytosolic PLD showed a marginal stimulation initially followed by a decline in activity (FIG. 4). Effects of other longer chain alcohols such as propanol and butanol were similar. Microsomal PLD showed a 20–25% promotion in activity between 0.1 and 1% (v/v) propanol (see FIG. 5). There was an initial promotion of cytosolic activity followed by a decline as observed for ethanol. Mitochondrial PLD showed only a marginal increase in the presence of propanol. All the three PLD preparations showed a decline in activity in the presence of n-butanol (data not shown). Thus, increasing chain length of the alcohol might affect PLD activity differently.

Acetaldehyde is a product of anaerobic metabolism, and off flavor due to acetaldehyde causes a decline in quality of produce. Microsomal, mitochondrial, and cytosolic PLD activities were inhibited by nearly the same level by increasing content of acetaldehyde in the assay mixture. At 2% v/v, all three forms of PLD were 80% inhibited (see FIG. 6).

Example 5

Effect of Metal ions on Phospholipase D activity

Sodium, potassium, magnesium and calcium are major ions present in produce tissue. Salts of these ions are also added to products during processing. Blending of produce in the presence of these ions may lead to a stimulation of PLD activity, especially since, calcium and magnesium have been reported to promote PLD activity in other systems (Galliard, 1980). To investigate the potential effect of metal ions on PLD activity, enzyme assays were performed in the presence of $Ca^{2+}$, $Mg^{2+}$, $K^+$ and $Na^+$. Increasing the concentration of calcium in the assay mixture resulted in different degrees of activation of microsomal, mitochondrial and cytosolic PLD activities. Microsomal and cytosolic PLD activities were maximally stimulated by nearly 40–50% at 0.5 mM of added calcium (see FIG. 7). Mitochondrial PLD showed marginal stimulation under such conditions. Interestingly, the rate of stimulation was much higher at low micromolar levels of calcium. The assay mixture contained 0.2 mM EGTA, a specific chelator of calcium which lowers the free calcium concentration to micromolar levels. Thus, at 0.2 mM of added calcium (10 $\mu$M of free calcium), both microsomal and cytosolic PLD activities were stimulated by nearly 40%. PLD activity was stimulated to a much higher degree in the presence of added magnesium chloride. Maximal stimulation of microsomal and cytosolic PLD was observed at 50 $\mu$M magnesium chloride (the level of free magnesium is taken as equal to added magnesium levels, since EDTA is a poor chelator of magnesium at pH 7.0 (see FIG. 8). Nearly 100% stimulation was obtained for both microsomal and cytosolic PLD at 50 $\mu$M magnesium chloride. The activity was reduced slightly with increasing magnesium chloride in the assay mixture (FIG. 8).

Figure 9:
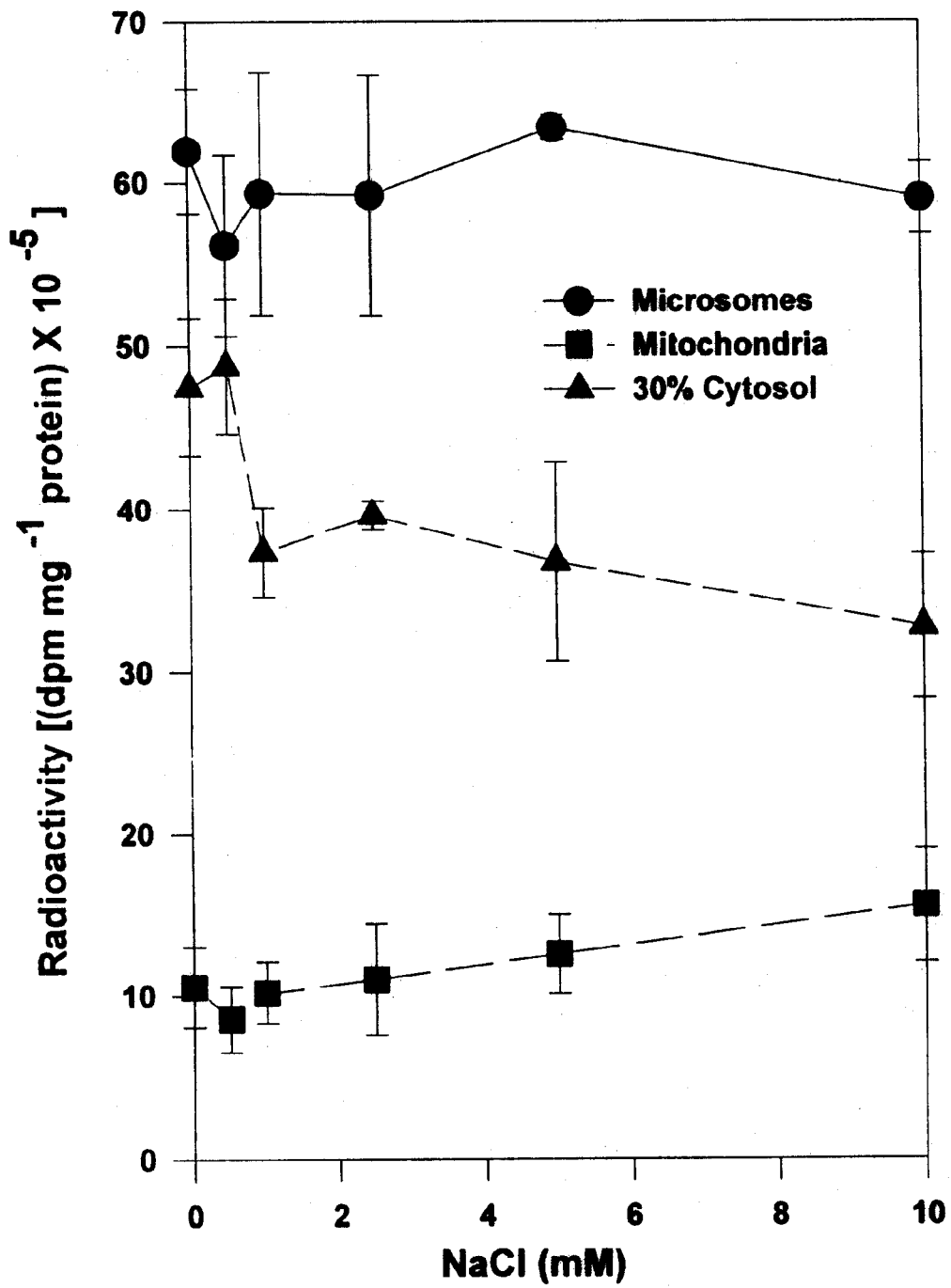
FIG. 9 illustrates the effect of NaCl on phospholipase D activity of sweet corn kernel.
Figure 10:
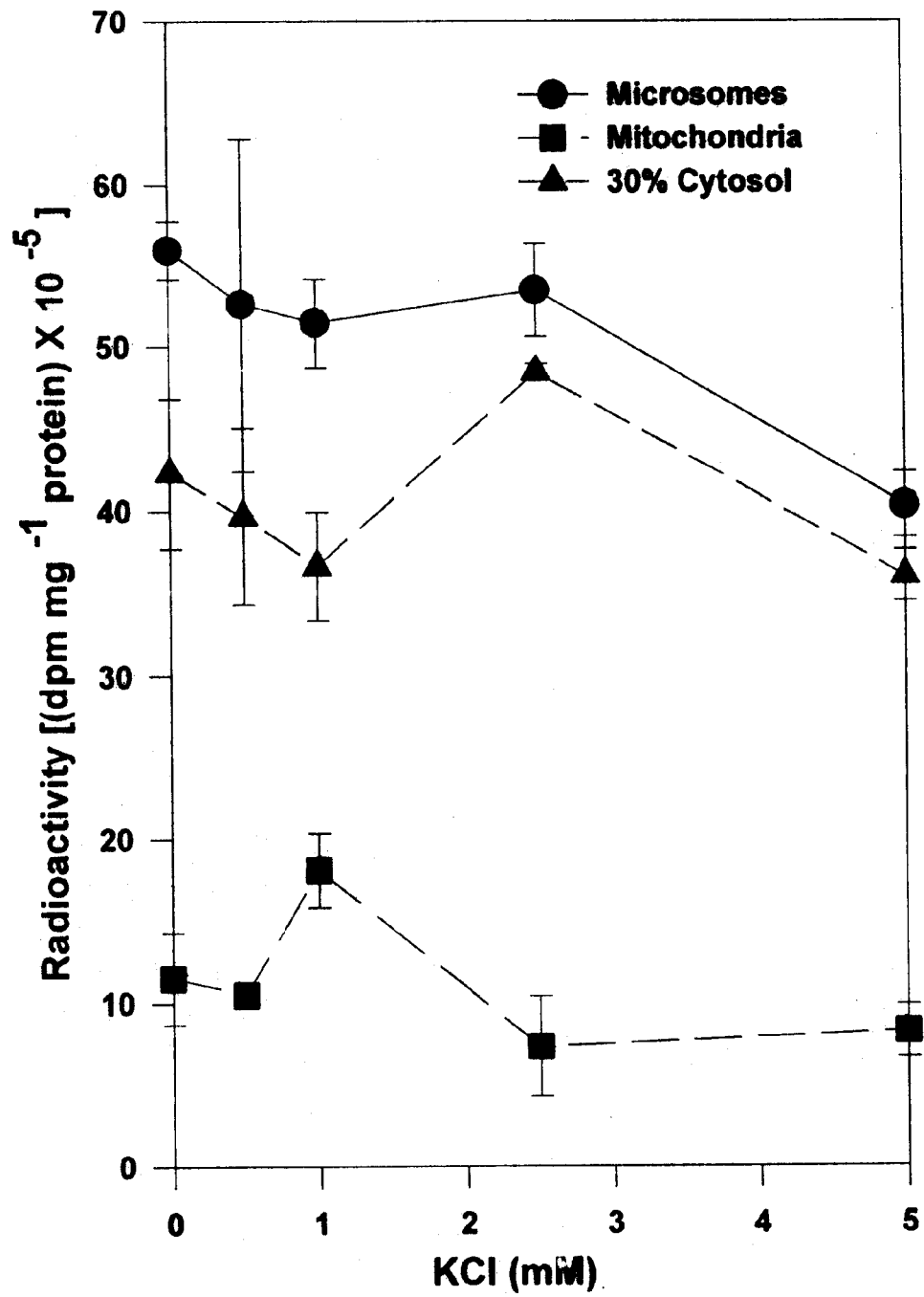
FIG. 10 illustrates the effect of KCl on phospholipase D activity of sweet corn kernel.

Monovalent salts such as potassium chloride and sodium chloride did not appear to have any major effects on PLD activity. Microsomal, mitochondrial and cytosolic PLD activities remained nearly the same in the presence of sodium chloride up to a concentration of 5 mM (FIG. 9). Microsomal PLD was inhibited by the addition of KCl up to 5 mM (FIG. 10). Both mitochondrial and cytosolic activities possessed nearly similar activity with respect to their respective controls (FIG. 10).

Example 6

Effect of Hexanal and Hexanol on Phospholipase D Activity

Protein Extraction: Sweet corn (Zea mays L. cv Peaches and Cream) was used for this study. The kernels were obtained locally from a grocery store and stored frozen at −20° C. until used. Frozen kernels were homogenized in 0.1 M Tris-HCl buffer at pH 7.5, containing 1 mM dithiothreitol, I mM phenylmethanesulfonylfluoride, 2 mM EDTA and 1 mM EGTA. The homogenate was filtered through four layers of cheese clothe. After removing the debris, the homogenate was subjected to differential centrifugation to separate mitochondria, microsomes and cytosol. The fraction comprising starch granules was removed by centrifuging the samples at 2500×g for 10 min. The resulting supernatant was subjected to centrifugation at 15000×g to pellet the mitochondrial membrane fraction. The supernatant from this step was centrifuged at 105,000×g to pellet the microsomal membranes. The supernatant was subjected to ammonium sulfate fractionation at 30 and 60% saturation to precipitate the cytosolic proteins. The precipitated proteins were pelleted by centrifugation at 15000×g and dissolved in 10 mM Tris HCl, pH 7.5, and dialyzed overnight in the same buffer also containing 0.1 mM DTT. Resuspended microsomal, mitochondrial membrane preparation and the cytosolic proteins were stored at −80° C. until used for phospholipase D assays.

Assay for Phospholipase D: Phospholipase D activity was determined by the liberation of choline from choline methyl labelled dipalmitoylphosphatidylcholine [L3-phosphatidyl (N-methyl-3H) choline 1,2-dipalmitoyl]. The basic assay mixture contained 0.1 M. Tris-HCl, pH 7.5, 0.2 mM EGTA, 1–2.5 ug of membrane or cytosolic protein (precipitated at 60% ammonium sulfate saturation) and 100,000 dpm of choline-labelled phosphatidylcholine in 0.1% Triton X-100 (final 0.01%), in a total volume of 1 ml. Hexanal and hexanol was added to the assay mixture and incubated for 5 min prior to the addition of substrate. The reaction was terminated after 10 min by the addition of 100 uL of 4N HCl, followed by 1 ml of chloroform: methanol (2:1 v/v) and left overnight. The amount of choline released during the reaction was determined by mixing 0.5 ml of the aqueous phase with 5 ml of scintillation fluid (Ecolume, ICN) and determining the amount of radiolabel using a Beckman LS 680 scintillation counter. The data presented are the Mean±standard error from 4–6 replicates from two separate experiments. The specific activity, CPM/mg protein=amount of radiolabel in the aqueous phase×2000).

It can be seen from FIGS. 11 to 18 that both hexanal and hexanol were effective inhibitors of PLD activity.

Example 7

Effect of Hexanal On Chlorophyll a and b, Protein and Carotenoid Levels in Parsley Leaves: Inhibition of Parsley Leaf Senescence by Hexanal

Mature parsley leaves were excised and floated in water to randomize the leaves. After thorough washing 10 leaflets were incubated in petri plates lined with Whatman #1 filter paper and containing 2.5 ml of water containing various amounts of hexanal and 0.001% final Tween –20. Controls with water alone and Tween –20 were also incubated. The petri plates were incubated in the dark for fourteen days. The leaves were removed, chopped to fine pieces, and portions used for protein and pigment analyses. For protein analysis, a known amount of leaf segments (usually 0.6–0.7 g) were ground with 0.1 N NaOH (1 ml). After removing the debris by centrifugation, protein was determined in aliquots, using the dye-binding method by Bradford, 1976. To measure the pigments, leaf segments were extracted with 5 ml of 95% ethanol overnight in the dark. The absorbance readings were measured at 470 nm to estimate chlorophyll a, at 647 nm for chlorophyll b and at 663 nm for carotenoid. The data presented are the mean of two independent estimations from two sets of leaves incubated separately. (Shown in FIGS. 19–22).

The data show that treating parsley leaves with increasing amounts of hexanol results in greater amounts of chlorophyll than controls. A decrease in the amount of chlorophyll indicates senescence. Therefore, the data indicates that in parsley leaves treated with increasing amounts of hexanol, less senescence or aging has occurred.

Example 8

Partial Purification of Phospholipase D

PLD has been reported to exist as several isoforms (Wang et al., 1993; Dyer et al., 1996). This conclusion was reached by the separation of PLD using size exclusion columns or by the expression of PLD genes in cloning systems. All membrane-degrading enzymes exist as soluble and membranous forms (Galliard, 1980) and the rationale for their compartmentation has not been fully established. PLD is reported to be encoded by a single gene (Ueki et al., 1995). Then, the existence of cytosolic and membranous PLD defies explanation. It has been reported that the association of PLD with the membrane could occur in a calcium-dependent manner (Ryu and Wang, 1996). Any potential biochemical differences that exist between the microsomal, mitochondrial and cytosolic forms of PLD needs systematic investigation.

To briefly address this question, PLD from mitochondrial and microsomal fraction was isolated by solubilization and subjected to partial purification using DEAE Sephacel and Sephacryl S-300 gel filtration. Cytosolic PLD was subjected to ammonium sulphate precipitation and the concentrated fraction was subjected to dialysis and anion exchange chromatography followed by gel filtration. The approximate molecular mass of the major peaks of PLD activity obtained after sephacryl gel filtration are given in Table 1. In spite of their differences in biochemical properties, the different isoforms of PLD obtained from the microsomal, mitochondrial and cytosolic fractions possessed a similar distribution of molecular masses. Four major isoforms with relative masses from 200 kD, 140–150 kD, 102–116 kD and 60–66 kD were observed in all three preparations, the only exception being the mitochondrial fraction where the 60–66 kD isoform was undetectable. The smallest isoform in the mitochondrial fraction possessed a relative molecular mass of 108 kD. The distribution of the various isoforms in the mitochondrial fraction show that the 200 kD isoform is nearly twice that of the other three isoforms on an activity basis (Table 2). In microsomal PLD, the relative distribution among the four isoforms is nearly equal. However, the cytosolic PLD shows the predominant existence of the 200 kD isoform (3–4 times) as compared to the other low molecular mass isoforms whose proportions are nearly equal (Table 2). If the presence of the various isoforms is a reflection of the in vivo distribution of PLD, then the differences in the relative distribution of the various isoforms may affect the total activity and physicochemical properties of PLD within a given subcellular compartment.

PLD activities appeared in both membranous and cytosolic fractions of sweet corn kernel. Even though Brauer et al. (1990) assayed PLD activities in corn root preparation only in 6,000 g and 90,000 g pellet, they did not discount the presence of PLD activity in 90,000 g supernatant as evidenced from their results. The existence of cytosolic and membranous forms of PLD has been recognized previously (Yoshida, 1979a; Galliard, 1980; Xu et al., 1996). Here we have shown the differential distribution of various isoforms in the membranous and cytosolic compartments. The cytosol possess the highest level of the 200 kD isoform. Since these preparations are only partially purified, we do not know the exact specific activities of these various forms. However, compartmentation of the 200 kD isoform in cytosol may have an advantage in stabilizing the membrane under stressful conditions.

Microsomal and cytosolic fractions of PLD showed optimal activity at pH 8.0, whereas that from mitochondria had the optimum activity at a pH around 7.5. It has been reported that PLD exist as different isoforms in castor bean and all these forms showed a pH optima of 6.5 (Dyer et al., 1994). However, Dyer et al. (1996) from their study on PLD from 10 dicots demonstrated that structural heterogeneity of PLD occurs widely in plants. Hence, it could be possible that the PLD forms observed in sweet corn could be different from castor bean with different catalytic properties. It has been reported that the PLD in mung bean has a pH optimum of around 5.0 (Herman and Chrispeels, 1980), whereas that from citrus callus tissue has a pH optimum of 6.5 (Witt et al., 1987). Similar to the results of microsomal and cytosolic PLD, Imamura and Horiuti (1979) obtained a pH optima of 8.0 for PLD from *Streptomyces chromofuscus*. Apparently, changes in pH of the processing medium may not significantly affect PLD activity.

Primary alcohols such as ethanol, propanol, butanol and hexanol and aldehydes such as acetaldehyde and hexanal appear to modulate PLD activity. The transphosphatidylation activity of PLD in the presence of alcohols such as methanol and ethanol is well established (Galliard, 1980). The mitochondrial and microsomal PLD showed a stimulation in the activity in the presence of ethanol. The cytosolic PLD activity appear to be inhibited at ethanol levels above 0.5%. Changes in activity in the presence of propanol or butanol was marginal. However, PLD activity was inhibited over 75% in all the preparations by acetaldehyde. A long chain aldehyde such as hexanal and its corresponding alcohol, hexanol, also showed potent inhibition of PLD activity. These effects could implicate other means of natural regulation of PLD activity. Acetaldehyde, which is inhibitory, is an undesirable byproduct of anaerobic breakdown of sugars.

In animal systems, hydroxy hexenal and other long chain aldehydes are promoters of PLD (Natarajan et al., 1993 ).

The differences in their mode of action may stem from the structural differences between plant and animal PLD and their physiological function. Other compounds with PLD-inhibitory activity have been reported in plants. Lysophosphatidylethanolamine, which is a natural constituent of plant membranes has been identified as a potent inhibitor of phospholipase D (Ryu et al., 1997) with application in horticulture industries.

$Ca^{2+}$ ions are known to activate PLD at low micromolar and millimolar levels ((Paliyath and Thompson, 1987; Brauer et al., 1990). In leaf and root tissues of maize seedlings, PLD activity was not stimulated by either calcium or magnesium (Pinhero et. al., 1998). In corn kernels, PLD activity was marginally stimulated by calcium ions. The stimulation by magnesium ions appeared to be slightly higher than that of calcium ions. As well, the microsomal and cytosolic PLD was activated to a higher extent than mitochondrial PLD. Thus, processing conditions having high levels of magnesium and calcium can lead to increased PLD. By contrast, monovalent salts such as sodium chloride or potassium chloride did not affect PLD activity substantially.

The existence of PLD isoforms with relative molecular masses ranging from 200, 140–150, 102–116 and 60–66 kD is an interesting feature that may have regulatory effects on phospholipid catabolism. Purification of PLD from different sources showed high variability in its molecular weights. Molecular weights of 200 kD, 112.5 kD and 90.5 kD have been reported in different tissues such as peanut seed (Heller et al., 1974), savoy cabbage leaves (Allgyer and Wells, 1979) and citrus callus tissues (Witt et al., 1987). Wang et al. (1993) identified a 92-kD protein as PLD. Dyer et al. (1994) reported three PLD isoforms from castor bean and the molecular masses of these variants were estimated by size-exclusion chromatography to be 330, 230 and 270 kD. It is likely that in corn kernels PLD could exist in an oligomeric form, with the molecular mass of the monomer being in the range of 60–66 kD. Further studies are required to delineate the molecular nature of PLD in corn kernels. As well, our studies also show that the relative distribution of various isoforms could vary between the mitochondrial, microsomal and cytosolic preparations. The cytosolic preparation had a 3- to 4-fold higher abundance of the 200 kD isoform as compared to the microsomal membranes. As well, on a total activity basis, cytosol possessed the highest level of phospholipase D activity. Whether this reflects the true in situ distribution or is a result of an extraction anomaly is not clear at present. However, the differences in the distribution of various isoforms and the potential differences in their biochemical and physical properties may determine the differential susceptibility of the sub-cellular structures to degradation under various physiological and processing conditions.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

FULL CITATIONS FOR REFERENCES
REFERRED TO IN THE SPECIFICATION

Allgyer, T. T.; Wells, M. A. Phospholipase D from savoy cabbage: Purification and preliminary kinetic characterization. *Biochem.* 1979, 18,5348–5353.

Bradford, M. M. A rapid and sensitive method for the quantitation of microgram quantities of protein utilizing the principle of protein-dye binding. *Anal. Biochem.* 1976, 72, 248–254.

Brauer, D.; Nungesser,. E.; Maxwell, R. J.; Schubert, C.; Tu, S. I. Evidence for and subcellular localization of a Ca-stimulated phospholipase D from maize roots. *Plant Physiol.* 1990, 92, 672–678.

Cockfort, S. Phospholipase D: Regulation by GTPases and protein kinase C and physiological relevance. *Prog. Lipid Res.* 1997, 35, 345–370.

Dyer, J. H.; Ryu, S. B.; Wang, X: Multiple forms of phospholipase D following germination and during leaf development of castor bean. *Plant Physiol.* 1994, 105, 715–724.

Dyer, J. H.; Zheng, S.; Wang, X: Structural heterogeneity of phospholipase D in 10 dicots. *Biochim. Biophys Res. Comm.* 1996,221, 31–36.

Exton, J. H. Phospholipase D: Enzymology, mechanisms of regulation, and function. *Physiol Rev.* 1997, 77, 303–320.

Edwards, G. E.; Gardestrom, P. Isolation of mitochondria from leaves of $C_3$, $C_4$ and crassulacean acid metabolism plants. *Methods Enzymol.*1987, 148, 421–433.

Galliard, T. Degradation of acyl lipids: Hydrolytic and oxidative enzymes. In *The Biochemistry of Plants, A comprehensive Treatise*; Stumpf, P. K., Conn, E. E. Eds.; Academic Press: New York, 1980.

Harris, W. E.; Knutson, C. M.; Stahl, W. L. A fluorescent method for study of cabbage phospholipase D activity. *Plant Physiol. Biochem.* 1995,33, 389–398.

Heller, M.; Mozes, N.; Pero(Abramovitz), I.; Maes, E. Phospholipase D from peanut seeds. *Biochem. Biophys. Acta.*1974, 369

Herman, E. M.; Chrispeels, M. J. Characteristics and subcellular distribution of phospholipase D and phosphatidic acid phosphatase in mung bean cotyledons. *Plant Physiol.* 1980, 66, 1001–1007.

Imamura, S.; Horiuti, Y. Purification of *Streptomyces chromofuscus* phospholipase D by hydrophobic affinity chromatography on palmitoyl cellulose. *J. Biochem.* 1979, 85, 79–95.

Kates, M. Hydrolysis of lecithin by plant plastid enzymes. *Can. J. Biochem. Physiol.* 1955, 33, 575–589.

McCormac, D. J.; Todd, J. F.; Paliyath, G.; Thompson, J. E. Modulation of bilayer fluidity affects lipid catabolism in microsomal membranes of tomato fruits. *Plant Physiol Biochem.* 1993, 31, 1–8.

Merillon, J. M.; Filali, M.; Duperon, P.; Montagu, M.; Chenieux, J. C.; Rideau, M. Effect of 2,4-dichlorophenoxyacetic acid and habituation on lipid and protein composition of microsomal membranes from periwinkle cell suspensions. *Plant Physiol. Biochem.* 1995, 30, 443–451.

Natarajan, V.; Scriber, W. M.; Taher, M. M. 4-Hydroxy nonenal a metabolite of lipid peroxidation activates phospholipase D in vascular endothelial cells. *Free radicals Biol Med.* 1993, 15, 365–375.

Paliyath, G; Thompson, J. E. Calcium and calmodulin-regulated breakdown of phospholipid by microsomal membranes from bean cotyledons. *Plant Physiol.* 1987, 83, 63–68.

Paliyath, G.; Droillard, M. J. The mechanisms of membrane deterioration and disassembly during senescence. *Plant Physiol. Biochem.* 1992, 30, 789–812.

Pinhero, R. G.; Paliyath, G.; Yada, R. Y.; Murr, D. P. Modulation of phospholipase D and lipoxygenase activities during chilling. Relation to chilling tolerance of maize seedlings. *Plant Physiol. Biochem.* 1998, 36,213–224.

Quarles, R. H.; Dawson, R. M. C. Distribution of phospholipase D in developing and mature plants. *Biochem. J.* 1969, 112, 787–794.

Ryu, S. B.; Wang, X. Expression of phospholipase D during castor bean leaf senescence. *Plant Physiol.* 1995, 108, 713–719.

Ryu, S. B.; Zheng, L.; Wang, X. Change in phospholipase D expression in soybeans during seed development and germination. *J. Amer. Oil Chemists. Soc.* 1996, 73,1171–1176.

Ryu, S. B.; Wang, X. Activation of phospholipase D and the possible mechanism of activation in wound-induced lipid hydrolysis in castor bean leaves. *Biochim. Biophys. Acta,* 1996, 1303, 243–250.

Ryu, S. B.; Karlson, B. H.; Ozgen, M.; Palta, J. P. Inhibition of phospholipase D by lysophosphatidylethanolamine, a lipid derived senescence-retardant. *Proc. Natl. acad. Sci. USA.,* 1997, 94,12717–12721.

Takano, K.; Kamoi, I.; Obara, T. Properties and degradation of rice bran spherosome. *J. Jpn. Soc. Food Sci.* 1989, 36, 468–474.

Todd, J. F; Paliyath, G.; Thompson, J. E. Effect of chilling on the activities of lipid-degrading enzymes in tomato fruit microsomal membranes. *Plant Physiol. Biochem.,* 1992, 30, 517–522.

Ueki, J.; Morioka, S.; Komari, T.; Kumashiro, T. Purification and characterization of phjsopholipase D (PLD) from rice (Oryza sativa L.) and cloning of cDNA for PLD from rice and maize (*Zea mays* L.). *Plant Cell Physiol.,* 1995, 36, 903–914.

Voisine, R.; Vezina, L-P.; Willemot, C. Modification of phospholipid catabolism in microsomal membranes of (-irradiated cauliflower (*Brassica oleracea* L.). *Plant Physiol* .1993, 102, 213–218.

Wang, X.; Dyer, J. H.; Zheng, L. Purification and immunological analysis of phospholipase D from germinating castor bean endosperm. *Arch Biocehm Biophys.* 1993, 306, 486–494.

Witt, W.; Yelenosky, G.; Mayer, R. T. Purification of phospolipase D from citrus callus tissue. *Archiv. Biochem. Biophy.* 1987, 259, 164–170.

Xu, L.; Paulsen, A. Q.; Ryu, S. B.; Wang, X. Intracellular localization of phospholipase D in leaves and seedling tissues of castor bean. *Plant Physiol.*1996, 111, 101–107.

Yoshida, S. Freezing injury and phospholipid degradation in vivo in woody plant cells. Subcellular localization of phospholipase D in living bark tissues of the black locust tree (*Robinia pseudoacacia* L.) *Plant Physiol.* 1979, 64, 241–246.

DETAILED LEGENDS FOR VARIOUS FIGURES

FIG. 1. Effect of protein on the activity of phospholipase D in sweet corn kernel. Membrane and soluble fractions were extracted from sweet corn kernel as described in methods. Phospholipase D activity was measured by the release of radiolabelled choline from 16:0/16:0 phosphatidylcholine [$L_3$-phosphatidyl(N-methyl-$^3$H)choline, 1,2-dipalmitoyl] in a 1 mL reaction mixture during an incubation period of 10 min. The values are mean±SE from four separate experiments.

FIG. 2. Effect of temperature on phospholipase D activity of sweet corn kernel. Membrane and soluble fractions were equilibrated in the assay mixture at appropriate temperatures for 10 minutes before initiating the reaction. Phospholipase D activity was measured by the release of radiolabelled choline from 16:0/16:0 phosphatidylcholine during an incubation period of 10 min at the indicated temperatures. The values are mean±SE from 3 estimations.

FIG. 3. Effect of pH on phospholipase D activity of sweet corn kernel. Phospholipase D activity in membrane and soluble fractions were assayed at various pH using Tris-HCl and citrate phosphate as the buffer systems. Radiolabeled choline released from 16:0/16:0 phosphatidylcholine during an incubation period of 10 min was estimated at various pH. The values are mean±SE from three separate experiments.

FIG. 4. Effect of ethanol on phospholipase D activity of sweet corn kernel. Phospholipase D activity was measured by the release of radiolabelled choline from 16:0/16:0 phosphatidylcholine during an incubation period of 10 min. The values are mean±SE from three separate experiments.

Figure 5:
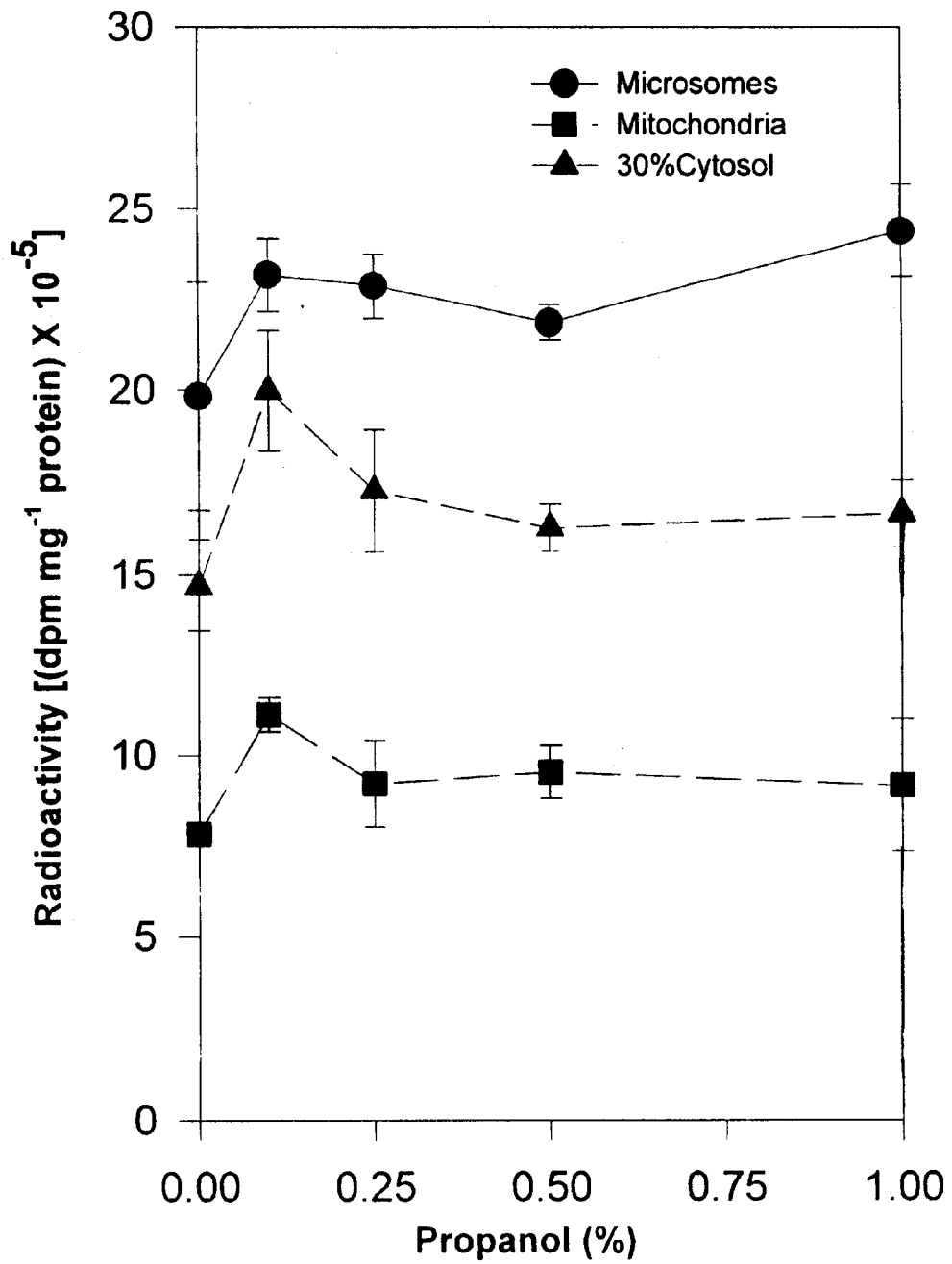
FIG. 5 illustrates the effect of propanol on phospholipase D activity of sweet corn kernel.

FIG. 5. Effect of propanol on phospholipase D activity of sweet corn kernel. Phospholipase D activity was measured by the release of radiolabelled choline from 16:0/16:0 phosphatidylcholine during an incubation period of 10 min. The values are mean±SE from three separate experiments.

Figure 6:
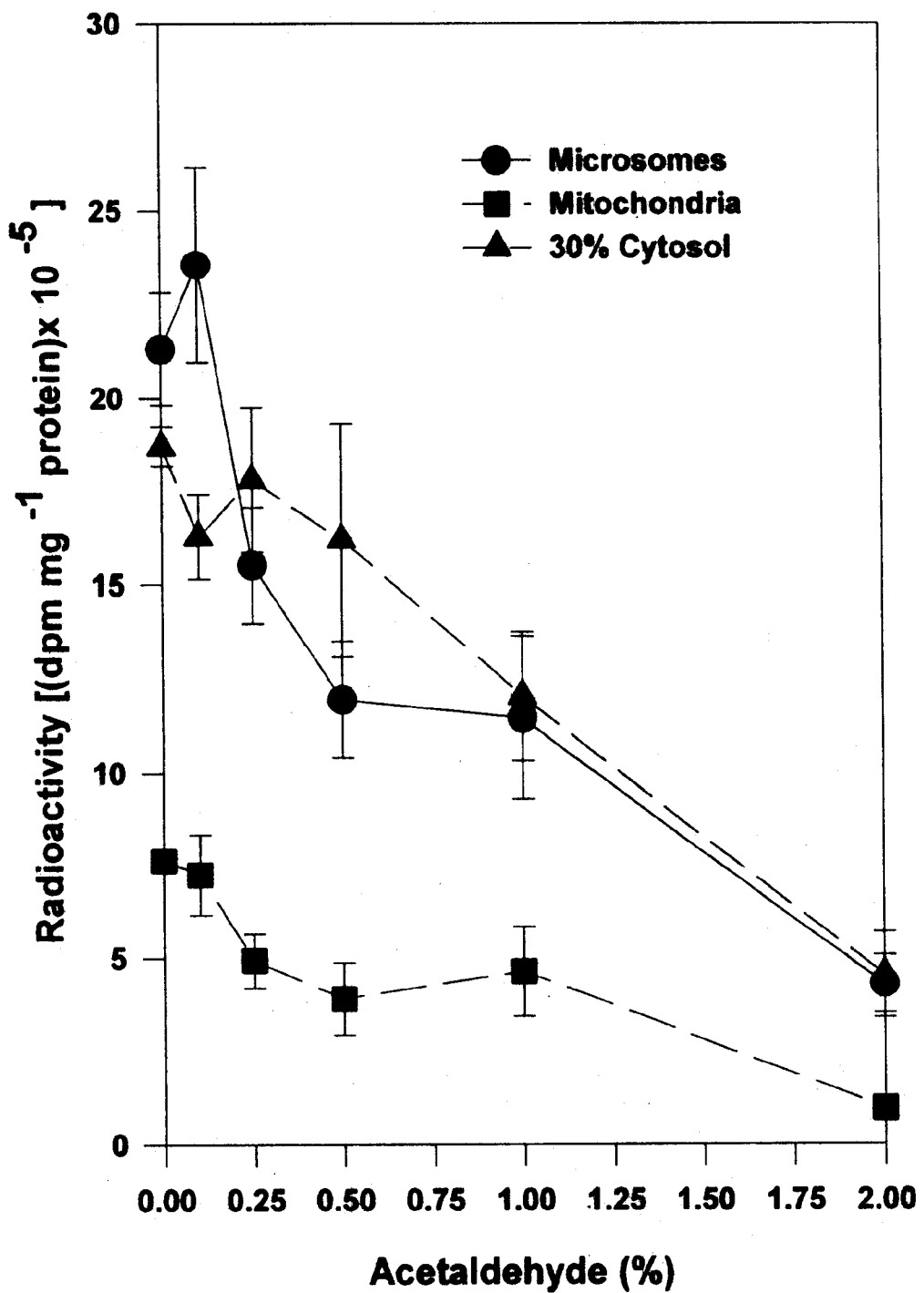
FIG. 6 illustrates the effect of acetaldehyde on phospholipase D activity of sweet corn kernel-membrane and soluble fractions.

FIG. 6. Effect of acetaldehyde on phospholipase D activity of sweet corn kernel-membrane and soluble fractions. Phospholipase D activity was measured by the release of radiolabelled choline from 16:0/16:0 phosphatidylcholine during an incubation period of 10 min. The values are mean±SE from three separate experiments.

Figure 7:
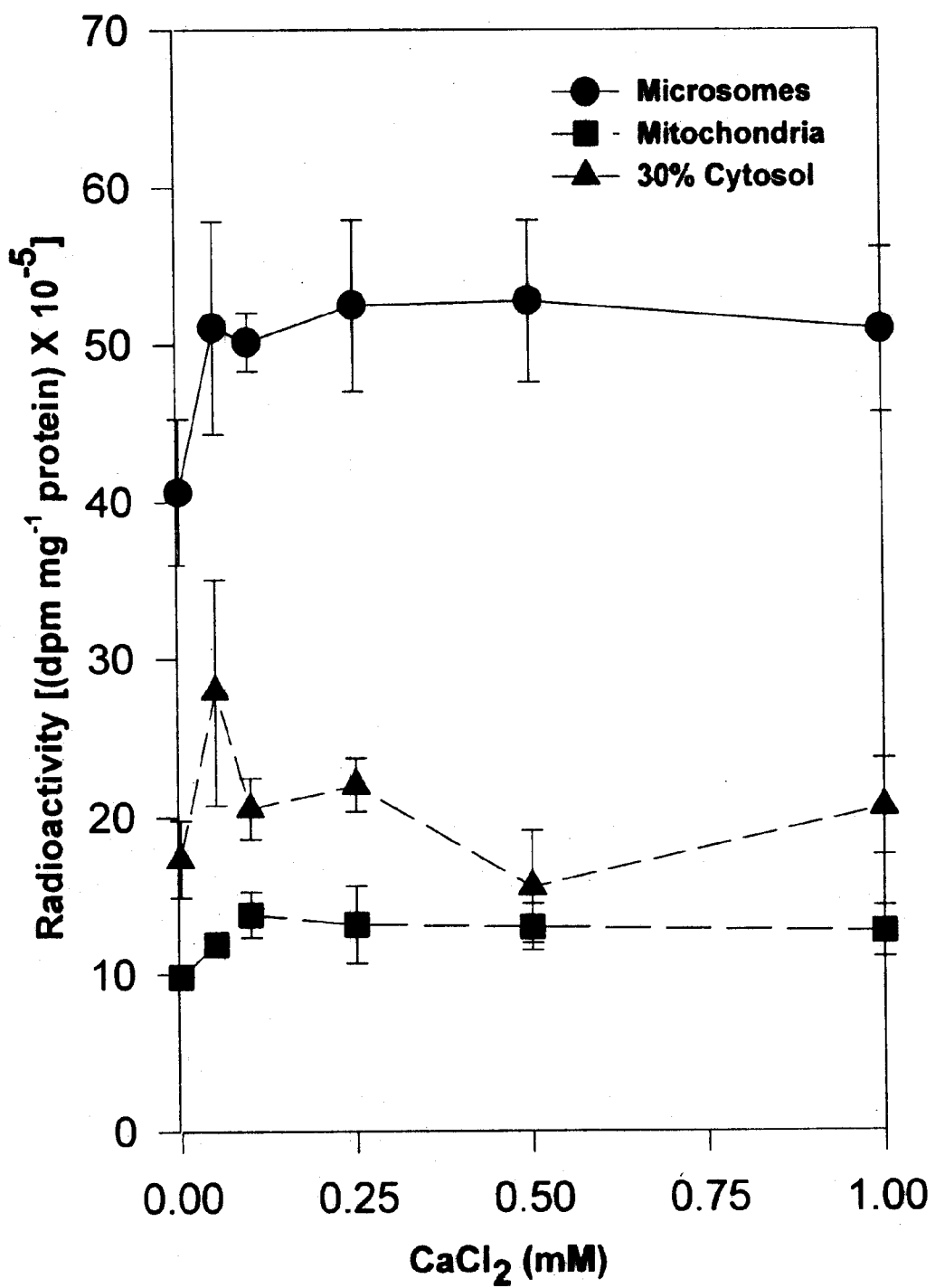
FIG. 7 illustrates the effect of calcium on phospholipase D activity of sweet corn kernel.
Figure 8:
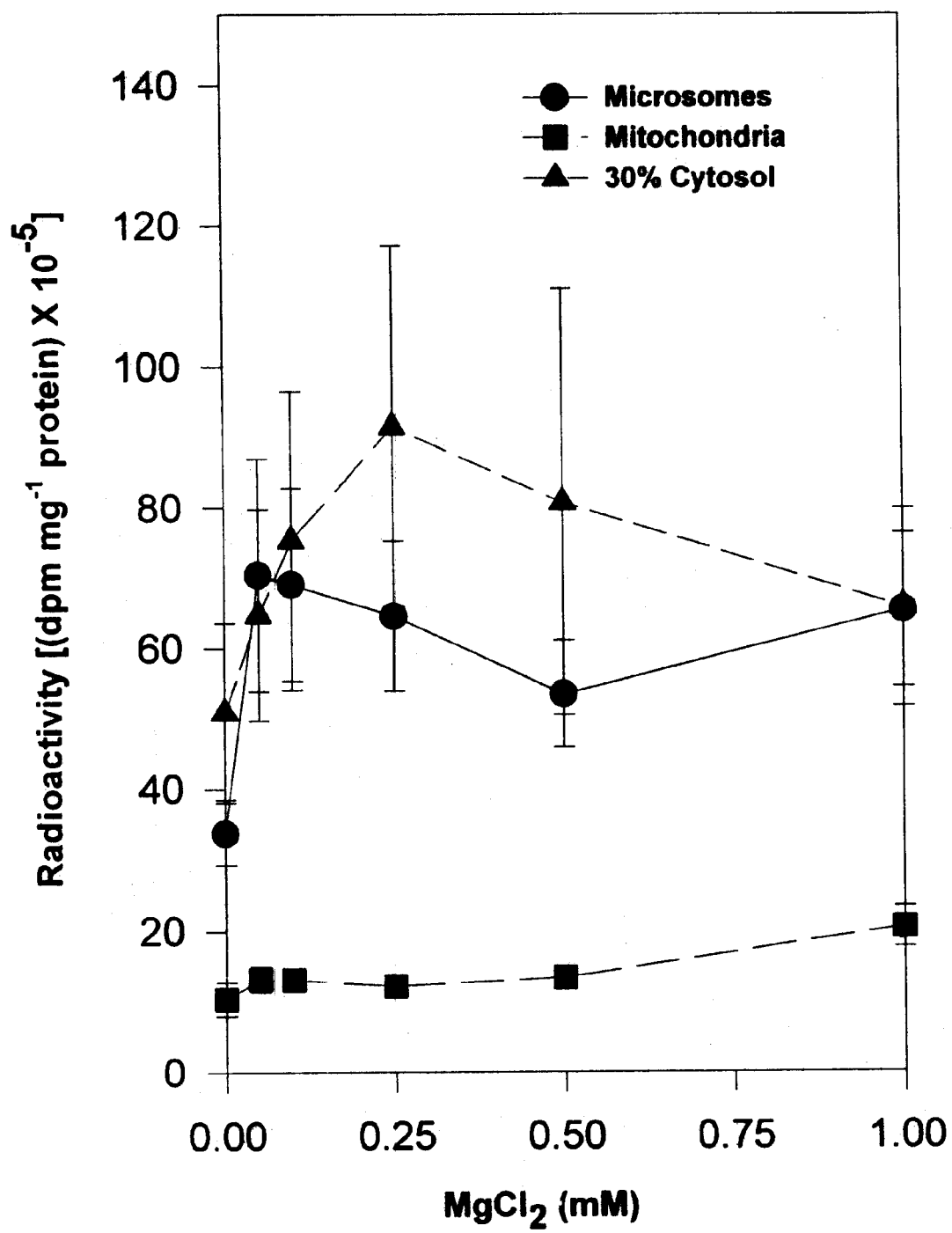
FIG. 8 illustrates the effect of $MgCl_2$ on phospholipase D activity of sweet corn kernel membrane and soluble fractions.

FIG. 7. Effect of calcium on phospholipase D activity of sweet corn kernel. Phospholipase D activity was measured by the release of radiolabelled choline from 16:0/16:0 phosphatidylcholine during an incubation period of 10 min. The reaction mixture contained 0.2 mM EGTA which lowered the free $Ca^{2+}$ levels to $\mu$m levels in the assay mixture. The free $Ca^{2+}$ concentration levels for added $Ca^{2+}$ concentrations of 100 and 250 $\mu$m were 1 and 40 $\mu$m respectively, as determined by a calcium ion electrode (Orion). The values are mean±SE from four separate experiments.

FIG. 8. Effect of $MgCl_2$ on phospholipase D activity of sweet corn kernel membrane and soluble fractions. Phospholipase D activity was measured by the release of radiolabelled choline from 16:0/16:0 phosphatidylcholine during an incubation period of 10 min. The data represent mean±SE from four separate experiments.

FIG. 9. Effect of NaCl on phospholipase D activity of sweet corn kernel. Phospholipase D activity was measured by the release of radiolabelled choline from 16:0/16:0 phosphatidylcholine during an incubation period of 10 min. The data represent mean±SE from three separate experiments.

FIG. 10. Effect of KCl on phospholipase D activity of sweet corn kernel. Phospholipase D activity was measured by the release of radiolabelled choline from 16:0/16:0 phosphatidylcholine during an incubation period of 10 min. The results represent mean±SE from three independent experiments.

Figure 11:
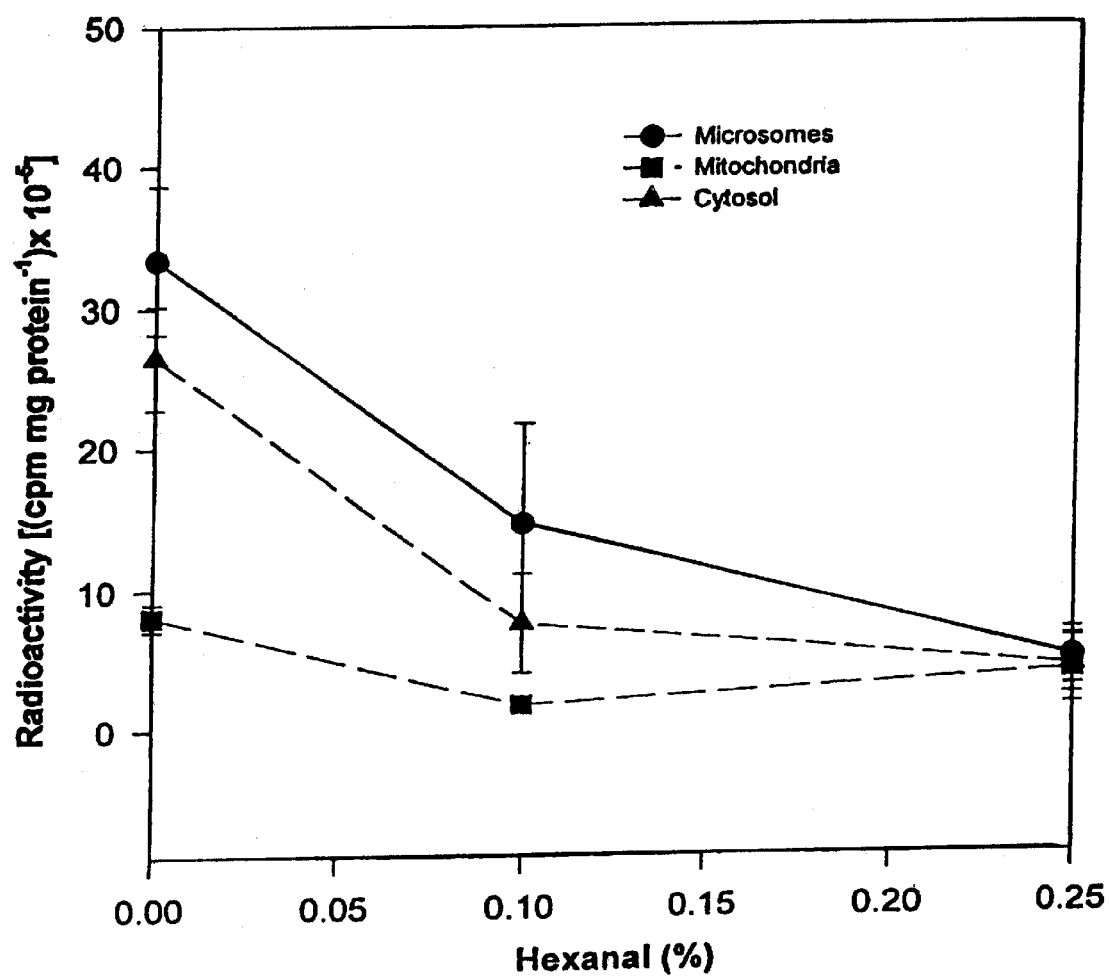
FIG. 11 illustrates the effect of protein on the activity of phospholipase D in sweet corn kernel after treatment with hexanal.

FIG. 11. Effect of % of hexanal on the activity of phopholipase D in sweet corn kernel. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean±SE from 4–6 replicates from two separate experiments.

Figure 12:
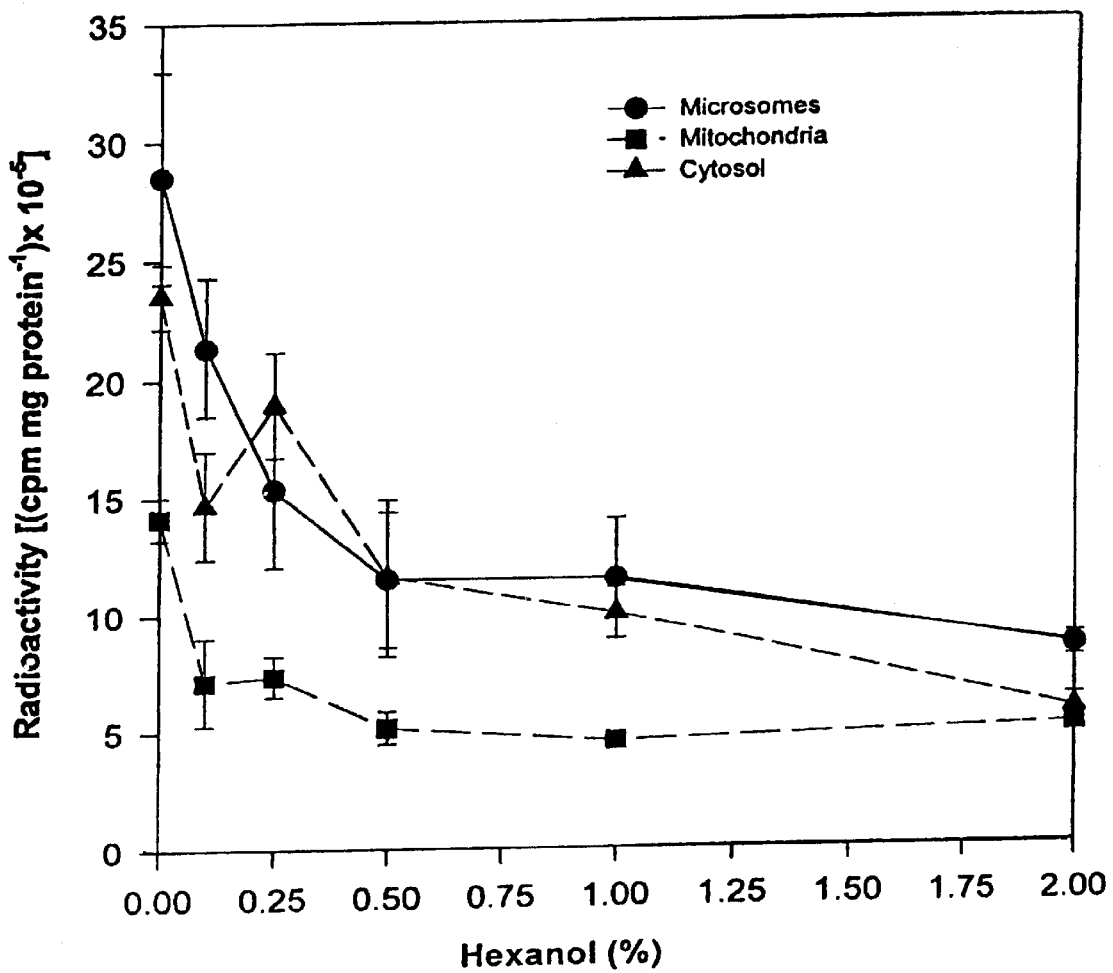
FIG. 12 illustrates the effect of protein on the activity of phospholipase D in sweet corn kernel after treatment with hexanol.

FIG. 12. Effect of % of hexanol on the activity of phopholipase D in sweet corn kernel. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean±SE from 4–6 replicates from two separate experiments.

Figure 13:
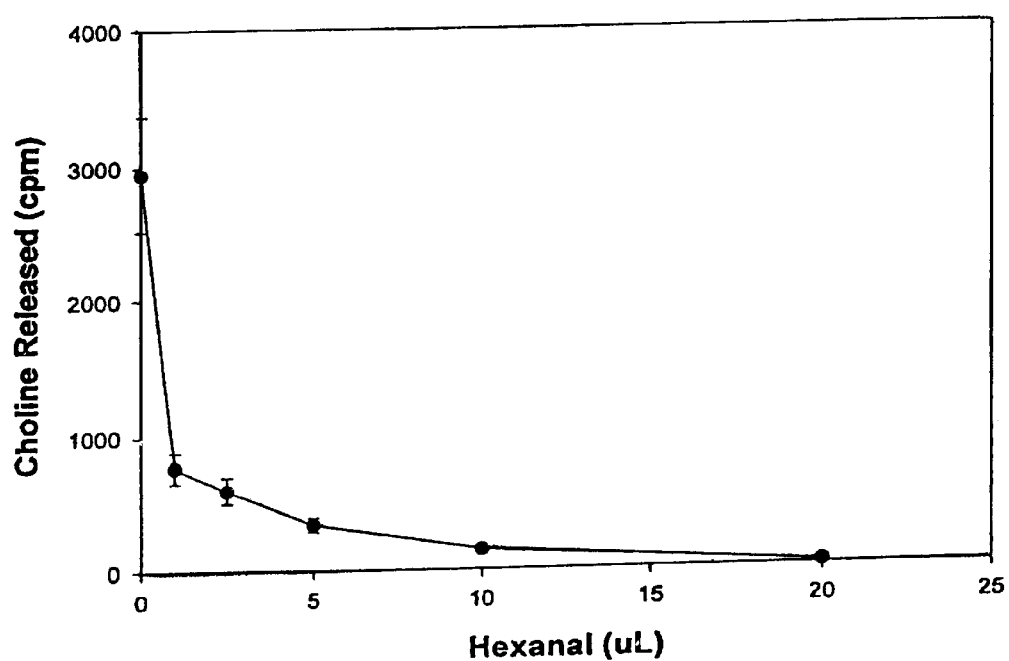
FIG. 13 illustrates the effect of hexanal treatment on microsomal phospholipase D activity in sweet corn kernel.

FIG. 13. Effect of amount of hexanal (ul) on the activity of phopholipase D in sweet corn kernel microsomes. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean±SE from 4–6 replicates from two separate experiments.

Figure 14:
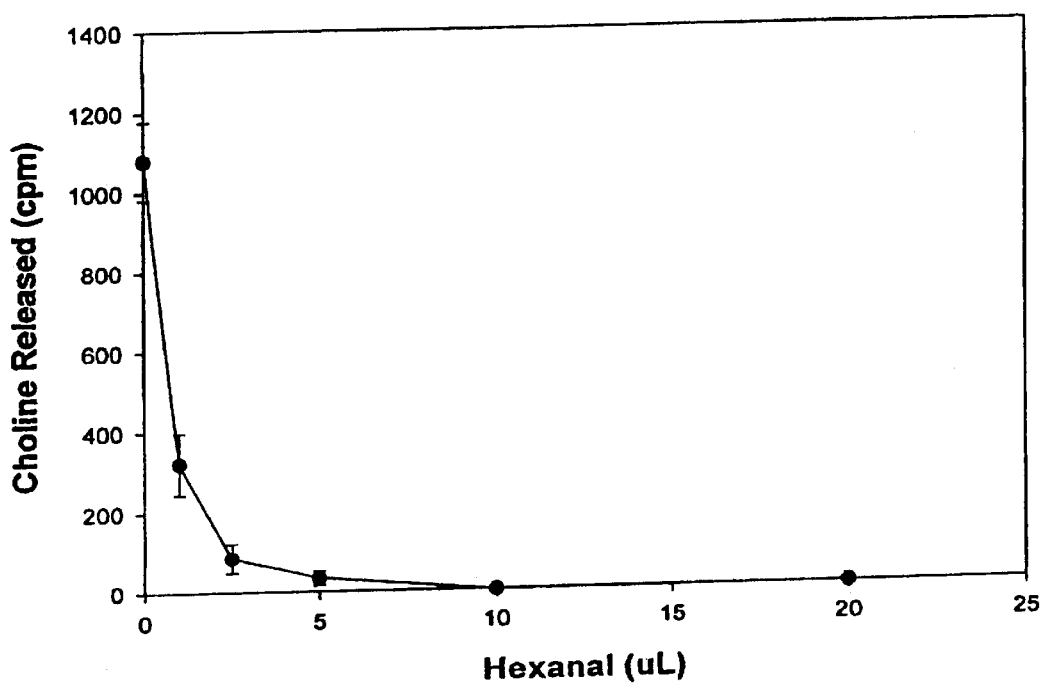
FIG. 14 illustrates the effect of hexanal treatment on mitochondrial phospholipase D activity in sweet corn kernel.

FIG. 14. Effect of amount of hexanal (ul) on the activity of phopholipase D in sweet corn kernel mitochondria. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean±SE from 4–6 replicates from two separate experiments.

Figure 15:
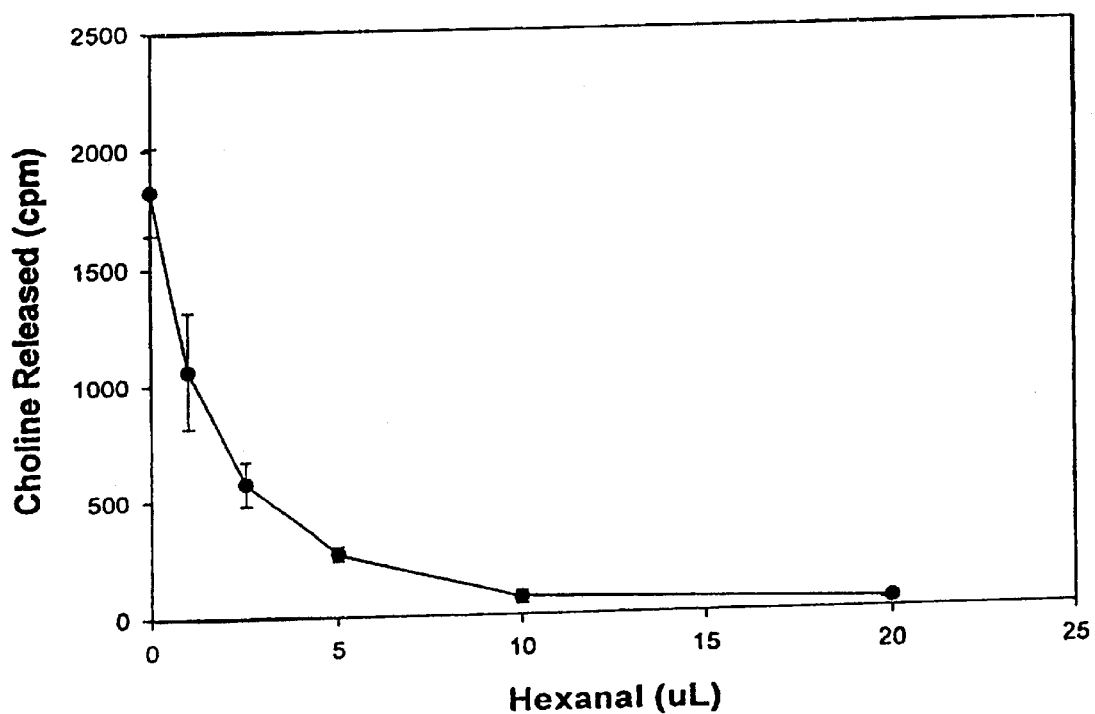
FIG. 15 illustrates the effect of hexanal treatment on cytosolic phospholipase D activity in sweet corn kernel.

FIG. 15. Effect of amount of hexanal (ul) on the activity of phopholipase D in sweet corn kernelcytosol. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean SE from 4–6 replicates from two separate experiments.

Figure 16:
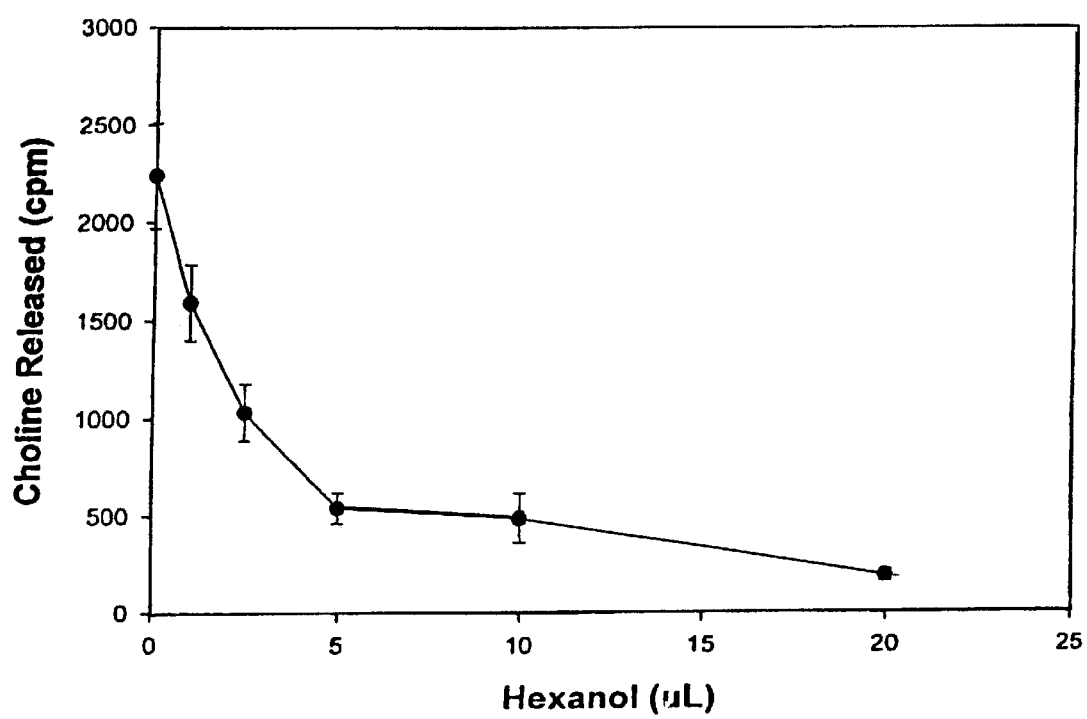
FIG. 16 illustrates the effect of hexanol treatment on microsomal phospholipase D activity in sweet corn kernel.

FIG. 16. Effect of amount of hexanol (ul) on the activity of phospholipase D in sweet corn kernel microsomes. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean±SE from 4–6 replicates from two separate experiments.

Figure 17:
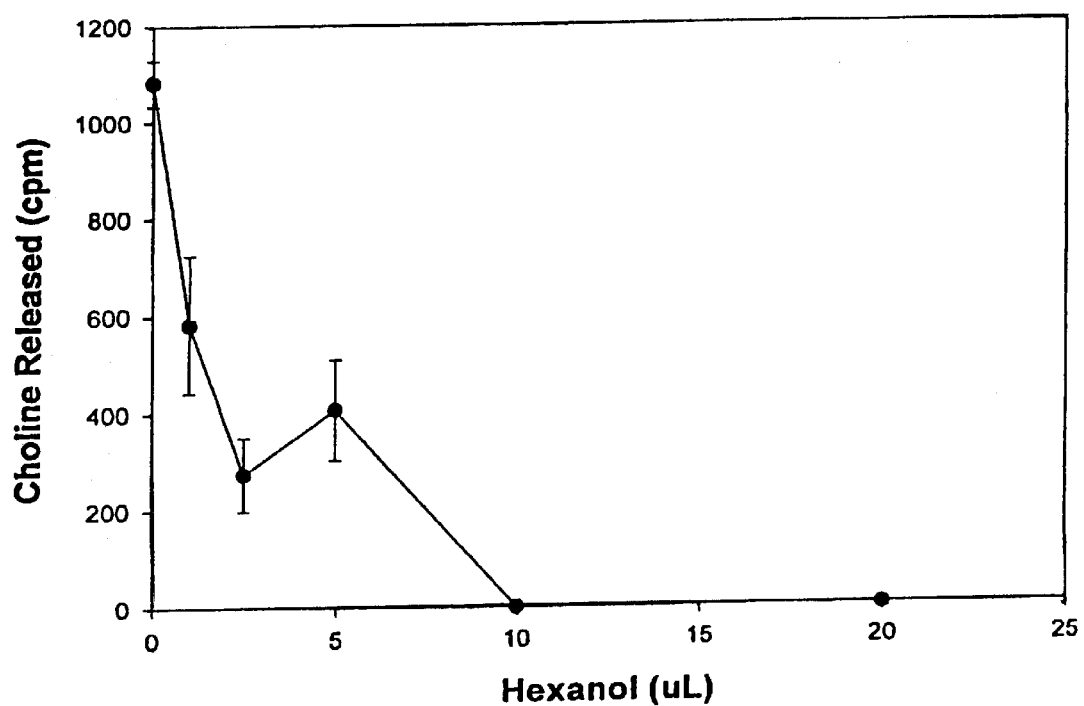
FIG. 17 illustrates the effect of hexanol treatment on mitochondrial phospholipase D activity in sweet corn kernel.

FIG. 17. Effect of amount of hexanol (ul) on the activity of phopholipase D in sweet corn kernel mitochondria. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean±SE from 4–6 replicates from two separate experiments.

Figure 18:
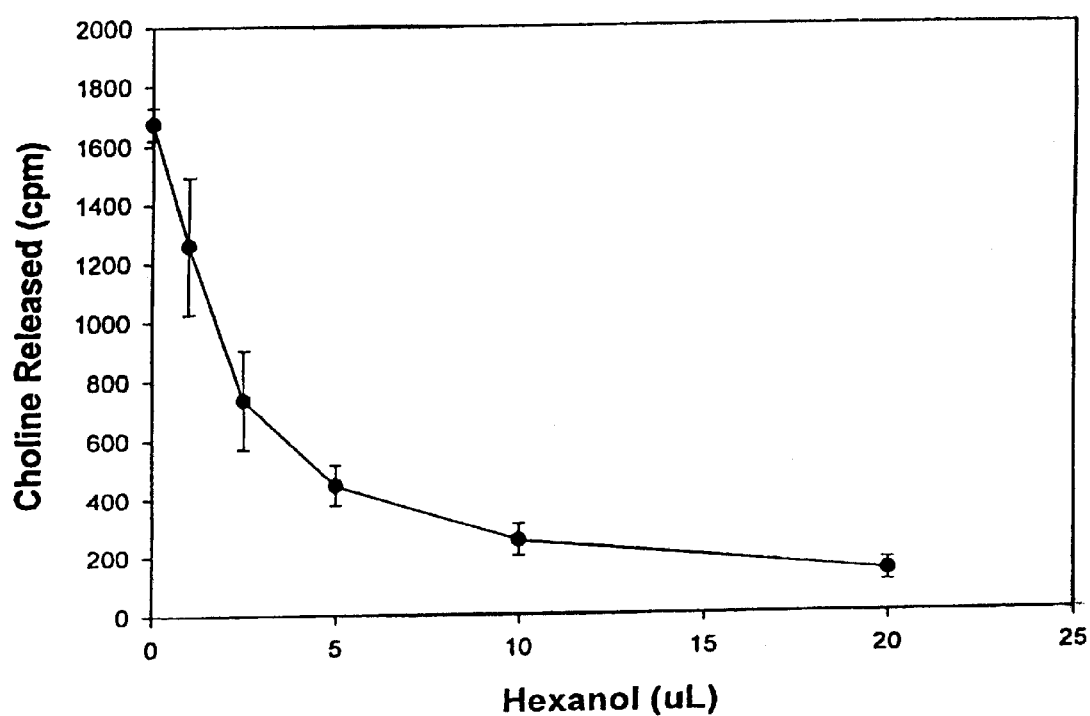
FIG. 18 illustrates the effect of hexanol treatment on cytosolic phospholipase D activity in sweet corn kernel.

FIG. 18. Effect of amount of hexanol (ul) on the activity of phopholipase D in sweet corn kernel cytosol. Membrane and soluble fractions were extracted from sweet corn as described in methods. Phospholipase D activity was measured by release of radiolabelled choline from 16:0/16:0 phosphatidylcholine during an incubation period of 10 min. At the indicated concentrations. The values are mean±SE from 4–6 replicates from two separate experiments.

Figure 19:
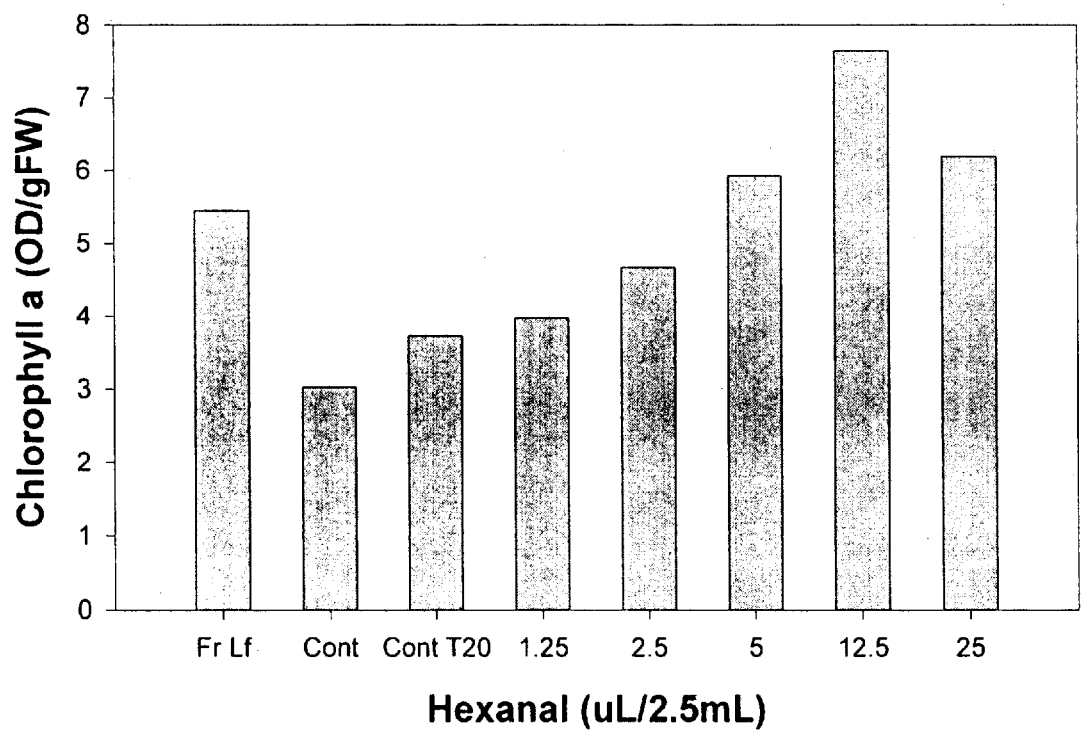
FIG. 19 is a bar graph illustrating the effect of hexanal on Chlorophyll a levels in parsley leaves.

FIG. 19. Effect of hexanal (ul/2.5ml) on chlorophyll a levels in parsley leaves. Mature parsley leaves were excised and floated in water to randomize the leaves. Parsley leaves were incubated for 14 days in the dark with 2.5 ml of water containing various amounts of hexanal (ul) and 0.001%Tween-20. Leaf segments were extracted with 5 ml of 95% ethanol overnight in the dark and the absorbance readings were measured at 470 nm. The values are mean±SE from two separate experiments.

Figure 20:
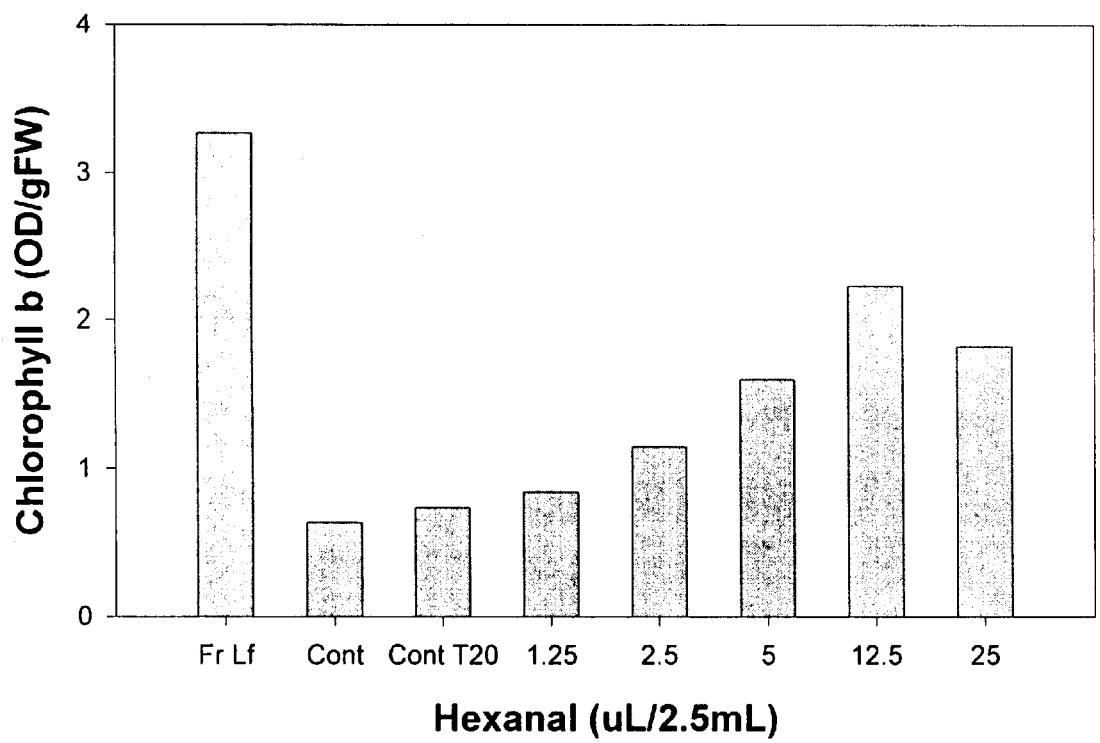
FIG. 20 is a bar graph illustrating the effect of hexanal on Chlorophyll b levels in parsley leaves.

FIG. 20. Effect of hexanal (ul/2.5ml) on chlorophyll b levels in parsley leaves. Mature parsley leaves were excised and floated in water to randomize the leaves. Parsley leaves were incubated for 14 days in the dark with 2.5 ml of water containing various amounts of hexanal (ul) and 0.001%Tween-20. Leaf segments were extracted with 5 ml of 95% ethanol overnight in the dark and the absorbance readings were measured at 647 nm. The values are mean±SE from two separate experiments.

Figure 21:
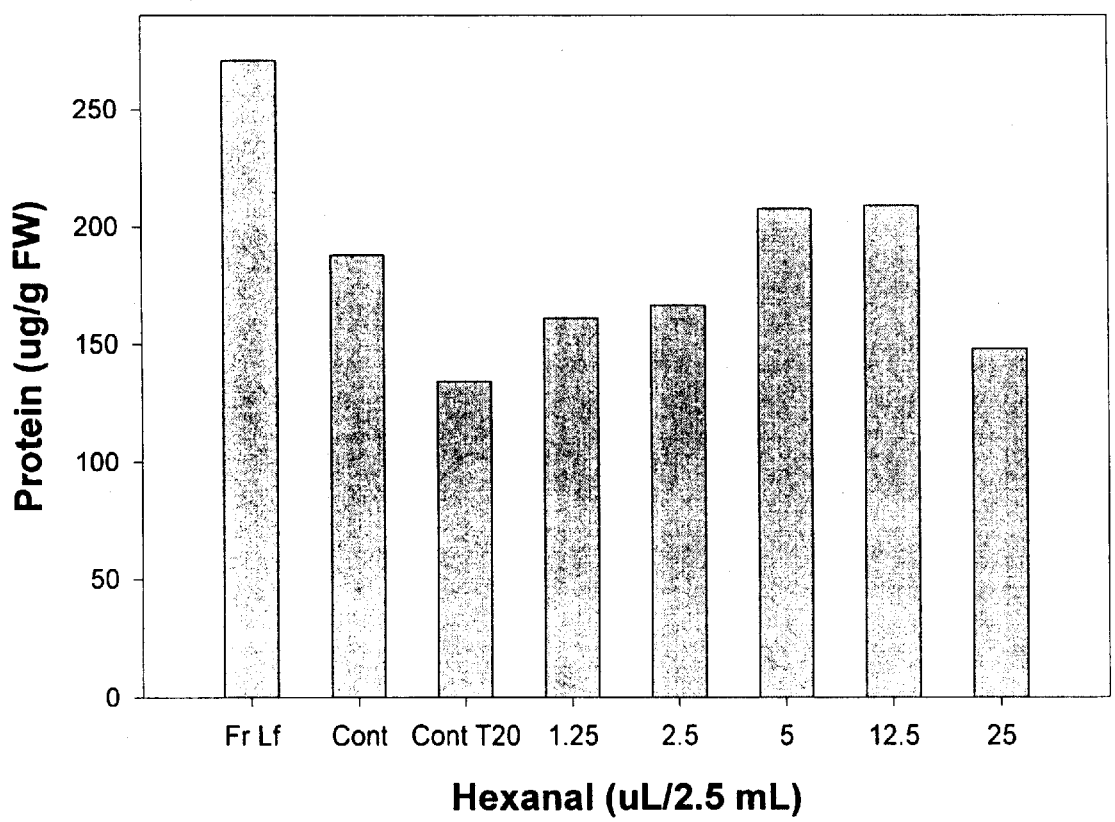
FIG. 21 is a bar graph illustrating the effect of hexanal on protein levels in parsley leaves.

FIG. 21. Effect of Hexanal (ul/2.5ml) on protein levels in parsley leaves. Mature parsley leaves were excised and floated in water to randomize the leaves. Parsley leaves were incubated for 14 days in the dark with 2.5 ml of water containing various amounts of hexanal (ul) and 0.001%Tween-20. Leaf segments were ground with 0.1 N NaOH (1 ml). Debris was removed by ventrfugation. Protein levels were determined in aliquots, using the dye-binding method of Bradford 1976. The values are mean±SE from two separate experiments.

Figure 22:
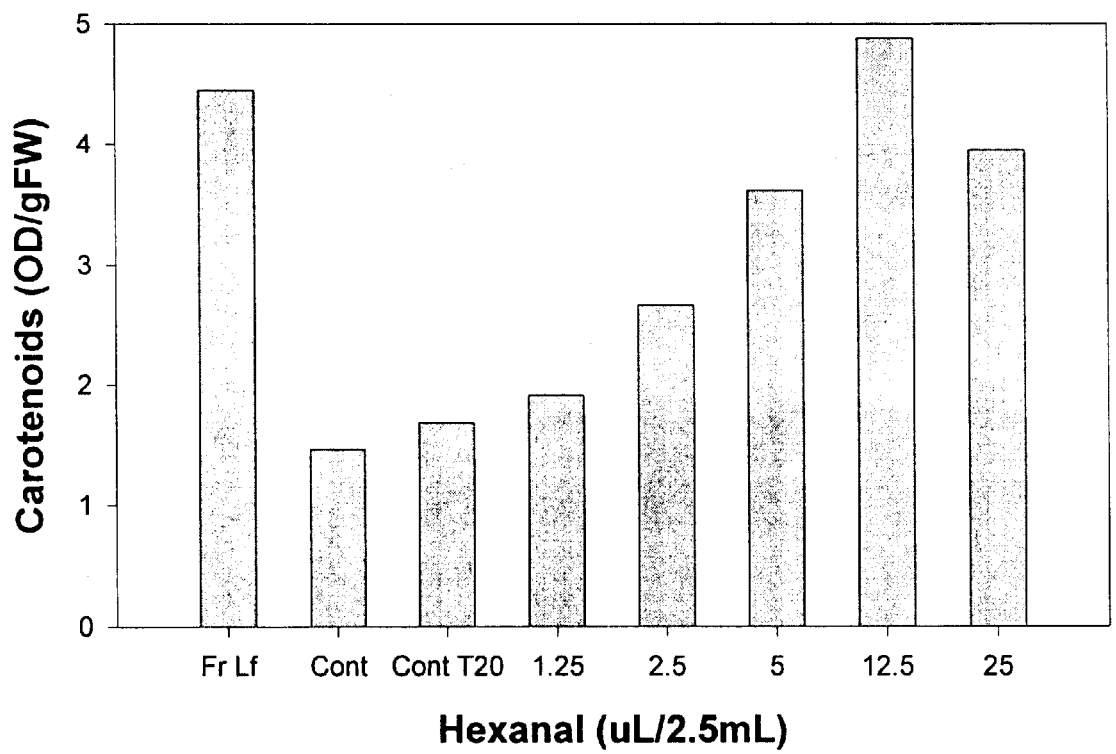
FIG. 22 is a bar graph illustrating the effect of hexanal on carotenoid levels in parsley leaves.

FIG. 22. Effect of hexanal (ul/2.5ml) on carotenoid levels in parsley leaves. Mature parsley leaves were excised and floated in water to randomize the leaves. Parsley leaves were incubated for 14 days in the dark with 2.5 ml of water containing various amounts of hexanal (ul) and 0.001% Tween-20. Leaf segments were extracted with 5 ml of 95% ethanol overnight in the dark and the absorbance readings were measured at 663 nm. The values are mean±SE from two separate experiments.

TABLE 1

Distribution of Molecular Forms of Phospholipase D in Sweet Corn Kernel Phospholipase D from the mitochondrial, microsomal and the cytosolic fractions were independently isolated and subjected to anion exchange on DEAE-Sephacel and size exclusion chromatography on sephacryl S-300 HR. Peaks of phospholipase D activity eluting from the sephacryl column were determined. Relative molecular mass of protein eluted at the peak was determined using a Sigma molecular mass standard mixture.

| | Molecular mass (kD) | | |
| --- | --- | --- | --- |
| Major peaks | Cytosol | Mitochondria | Microsomes |
| 1 | 200 | 200 | 200 |
| 2 | 150 | 140 | 140 |
| 3 | 116 | 116 | 102 |
| 4 | 66 | 108 | 60 |

TABLE 2

Relative Proportion of PLD Activity in the Major Peaks Eluted During Purification Using Sephacryl Gel Filtration
PLD activity was measured from the fractions collected during gel filtration through a Sephacryl S-300 HR column and the activity under the peak was calculated. The peak with the smallest area is considered as 1 and others are expressed as a multiple of this value.

| Protein fraction | Relative proportion of PLD activity |
| --- | --- |
| Cytosol | 4.6:1.2:1:1.3 (200:150:116:66) |
| Microsomes | 1.3:1.4:1.8:1 (200:140:102:60) |
| Mitochondria | 2.3:1:1.02:1 (200:140:116:108) |

We claim:

1. A method for inhibiting senescence in harvested plant material comprising administering to the harvested plant material an amount of about 0.0005% to less than 0.1% (w/w) of a compound selected from the group consisting of a $C_6$ aldehyde, a $C_6$ alcohol, a monoterpene aldehyde, and a monoterpene alcohol, wherein the compound is administered by spraying, brushing, wiping, or washing the harvested plant material with the compound, or by immersing the harvested plant material in the compound.

2. The method according to claim 1, wherein the compound is selected from the group consisting of hexanal, hexanol, hexenal and hexenol.

3. The method according to claim 1, wherein the compound is hexanol.

4. The method according to claim 1, wherein the compound is hexanal.

5. The method according to claim 1, wherein the harvested plant material is a fruit or a vegetable.

6. The method according to claim 5, wherein the vegetable is sweet corn (*Zea mays*).

7. The method according to claim 5, wherein the fruit is tomato.

8. The method according to claim 5, wherein the vegetable is parsley.

9. The method of claim 1, wherein the compound is administered by immersing the harvested plant material in the compound.

10. The method of claim 1, wherein the compound is administered by immersing the harvested plant mateiral in the compound.

11. The method of claim 1, wherein the compound is administered by brushing the harvested plant material with the compound.

12. The method of claim 1, wherein an amount of about 0.08% to about 0.1% (w/w) of the compound is administered to the harvested plant material.

13. The method of claim 1, wherein an amount of about 0.06% to about 0.08% (w/w) of the compound is administered to the harvested plant material.

14. The method of claim 1, wherein an amount of about 0.04% to about 0.06% (w/w) of the compound is administered to the harvested plant material.

15. The method of claim 1, wherein an amount of about 0.02% to about 0.04% (w/w) of the compound is administered to the harvested plant material.

16. The method of claim 1, wherein an amount of about 0.0005% to about 0.02% (w/w) of the compound is administered to the harvested plant material.

17. A method for inhibiting the senescence of an unharvested plant, fruit or vegetable, comprising administering to the unharvested plant, fruit or vegetable, after growth of the plant, fruit or vegetable has stopped, an amount of about 0.0005% to less than 0.1% (w/w) of a compound selected from the group consisting of a $C_6$ aldehyde, a $C_6$ alcohol, a monoterpene aldehyde and a monoterpene alcohol, wherein the compound is administered by spraying, brushing, wiping, or washing the unharvested plant, fruit or vegetable with the compound, or by immersing the unharvested plant, fruit or vegetable in the compound.

18. A method of inhibiting the senescence of the fruit or vegetable according to claim 17, wherein the compound is selected from the group consisting of hexanal, hexanol, hexenal, and hexenol.

19. The method according to claim 17 wherein the compound is hexanal.

20. The method according to claim 17 wherein the compound is hexanol.

21. The method of claim 17, wherein the compound is administered by spraying the unharvested plant material with the compound.

22. The method of claim 17, wherein the compound is administered by immersing the unharvested plant material in the compound.

23. The method of claim 17, wherein the compound is administered by brushing the unharvested plant material with the compound.

24. A method for inhibiting fruit ripening comprising administering to a fruit an amount of about 0.0005% to less than 0.1% (w/w) of a compound selected from the group consisting of a $C_6$ aldehyde, a $C_6$ alcohol, a monoterpene aldehyde, and a monoterpene alcohol, wherein the compound is administered by spraying, brushing, wiping, or washing the fruit with the compound, or by immersing the fruit in the compound.

25. A method for inhibiting senescence of a non-growing plant material comprising administering to a plant bearing non-growing plant material an amount of about 0.0005% to less than 0.1% (w/w) of a compound selected from the group consisting of a $C_6$ aldehyde, a $C_6$ alcohol, a monoterpene aldehyde, and a monoterpene alcohol, wherein the compound is administered by spraying, brushing, wiping, or washing the plant with the compound, or by immersing the plant in the compound.

26. A method for inhibiting fruit ripening comprising administering to a fruit an amount of about 0.0005% to less than 0.1% (w/w) of a compound selected from the group consisting of a $C_6$ aldehyde, a $C_6$ alcohol, a monoterpene aldehyde, and a monoterpene alcohol, wherein the compound is administered by vapour to the fruit, for a period of time of less than 24 hours.

27. A method for inhibiting senescence in a harvested plant material comprising administering to the harvested plant material an amount of about 0.0005% to less than 0.1% (w/w of a solution) of hexanol, wherein the hexanol is administered by spraying brushing, wiping, or washing the harvested plant material with the hexanol, or by immersing the harvested plant material in the hexanol.

28. A method for inhibiting senescence in a harvested plant material comprising administering to the harvested plant material an amount of about 0.0005% to less than 0.1% (w/w of a solution) of hexanal, wherein the hexanal is administered by spraying, brushing, wiping, or washing the harvested plant material with the hexanal, or by immersing the harvested plant material in the hexanal.

29. A method for inhibiting fruit ripening comprising administering to a fruit an amount of about 0.0005% to less than 0.1% (w/w of a solution) of hexanol, wherein the hexanol is administered by spraying, brushing, wiping, or washing the fruit with the hexanol, or by immersing the fruit in the hexanol.

30. A method for inhibiting fruit ripening comprising administering to a fruit an amount of about 0.0005% to about 0.1% (w/w of a solution) of hexanal, wherein the hexanal is administered by spraying, brushing, wiping, or washing the fruit with the hexanal, or by immersing the fruit in the hexanal.

31. A method for inhibiting senescence of a non-growing plant material comprising administering to a plant material bearing non-growing plant material an amount of about 0.0005% to about 0.1% (w/w of a solution) of hexanol, wherein the hexanol is administered by spraying, brushing, wiping, or washing the plant with the hexanol, or by immersing the plant in the hexanol.

32. A method for inhibiting senescence of a non-growing plant material comprising administering to a plant bearing non-growing plant material an amount of about 0.0005% to less than 0.1% (w/w of a solution) of hexanal, wherein the hexanal is administered by spraying, washing, brushing, wiping the plant with the hexanal or by immersing the plant in the hexanal.

33. A method for inhibiting non-growing plant material, comprising administering to a fruit an amount of about 0.0005% to less than 0.1% (w/w) of a compound selected from the group consisting of a $C_6$ aldehyde, a $C_6$ alcohol, a monoterpene aldehyde, and a monoterpene alcohol, wherein the compound is administered by vapour to the fruit, for a period of time of less than 24 hours.

34. A method for inhibiting the senescence of an unharvested plant, fruit or vegetable, comprising administering to the unharvested plant, fruit or vegetable, an amount of about 0.0005% to less than 0.1% (w/w) of a compound selected from the group consisting of a $C_6$ aldehyde, a $C_6$ alcohol, a monoterpene aldehyde and a monoterpene alcohol, wherein the compound is administered by vapour to the unharvested plant material, for a period of time of less than 24 hours.

35. A method of inhibiting the senescence of the fruit or vegetable according to claim 34 wherein the compound is selected from the group consisting of hexanal, hexanol, hexenal, and hexenol.

36. The method according to claim 34, wherein the compound is hexanal.

37. The method according to claim 34, wherein the compound is hexanol.

38. A method for inhibiting senescence in harvested plant material comprising administering, to the harvested plant material an amount of about 0.0005% to less than 0.1% (w/w) of a compound selected from the group consisting of a $C_6$ aldehyde, a $C_6$ alcohol, a monoterpene aldehyde and a monoterpene alcohol, wherein the compound is administered by vapor to the harvested plant material for a period of time of less than 24 hours.

39. The method according to claim 38 wherein the compound is hexanal.

40. The method according to claim 38 wherein the compound is hexanol.

41. The method of claim 38, wherein an amount of about 0.08% to less than 0.1% (w/w) of the compound is administered to the harvested plant material.

42. The method of claim 38, wherein an amount of about 0.06% to about 0.08% (w/w) of the compound is administered to the harvested plant material.

43. The method of claim 38, wherein an amount of about 0.04% to about 0.06% (w/w) of the compound is administered to the harvested plant material.

44. The method of claim 38, wherein an amount of about 0.02% to about 0.04% (w/w) of the compound is administered to the harvested plant material.

45. The method of claim 38, wherein an amount of about 0.0005% to about 0.02% (w/w) of the compound is administered to the harvested plant material.

* * * * *

UNITED STATES PATENT AND TRADEMARK OFFICE
CERTIFICATE OF CORRECTION

PATENT NO. : 6,514,914 B1  Page 1 of 1
DATED : February 4, 2003
INVENTOR(S) : Gopinadhan Paliyath et al.

It is certified that error appears in the above-identified patent and that said Letters Patent is hereby corrected as shown below:

<u>Title page,</u>
Item [75], Inventors, (third inventor) should be -- Dennis P. Murr --.

Signed and Sealed this

Thirteenth Day of June, 2006

JON W. DUDAS
*Director of the United States Patent and Trademark Office*